(12) United States Patent
Sakamoto et al.

(10) Patent No.: US 7,561,238 B2
(45) Date of Patent: Jul. 14, 2009

(54) LIQUID CRYSTAL DISPLAY DEVICE AND METHOD OF MANUFACTURING THE SAME

(75) Inventors: Michiaki Sakamoto, Tokyo (JP); Takahiko Watanabe, Tokyo (JP); Hirofumi Ihara, Tokyo (JP); Hironori Kikkawa, Tokyo (JP); Mamoru Okamoto, Tokyo (JP); Shinichi Nakata, Tokyo (JP); Yuji Yamamoto, Tokyo (JP); Masayoshi Suzuki, Tokyo (JP); Teruaki Suzuki, Tokyo (JP); Toshiya Ishii, Tokyo (JP); Hiroshi Kanoh, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 0 days.

(21) Appl. No.: 11/787,013

(22) Filed: Apr. 13, 2007

(65) Prior Publication Data

US 2008/0074586 A1 Mar. 27, 2008

Related U.S. Application Data

(60) Continuation of application No. 09/852,077, filed on May 9, 2001, now abandoned, which is a division of application No. 09/363,868, filed on Jul. 29, 1999, now abandoned.

(30) Foreign Application Priority Data

Aug. 3, 1998 (JP) ............................. 1998/219314
Jun. 15, 1999 (JP) ............................. 1999/168334

(51) Int. Cl.
*G02F 1/1343* (2006.01)
(52) U.S. Cl. ...................... 349/141; 349/43; 349/139
(58) Field of Classification Search ................. 349/106, 349/139, 141, 143, 42–43; 257/59, 72
See application file for complete search history.

(56) References Cited

U.S. PATENT DOCUMENTS 4,043,647 A 8/1977 Oue et al.

(Continued)

FOREIGN PATENT DOCUMENTS

| JP | 04-261522 | 9/1992 |
| JP | 05-505247 | 8/1993 |
| JP | 06-43461 | 2/1994 |
| JP | 10-186351 | 7/1998 |

OTHER PUBLICATIONS

Soref, R. A., Field Effects in Nematic Liquid Crystals Obtained with Interdigital Electrodes, Journal of Applied Physics, vol. 45, No. 12 (5466).

*Primary Examiner*—Dung T. Nguyen
(74) *Attorney, Agent, or Firm*—Scully, Scott, Murphy & Presser, P.C.

(57) ABSTRACT

In a liquid crystal display device comprising a first substrate 101 having a color filter, a second substrate 131 and a liquid crystal layer disposed therebetween, a color filter layer 110 is disposed on a protection film 108 of a thin film transistor formed on the first substrate 101 so as to be partitioned by a light shielding portion 111, and a common electrode 103 is disposed thereon. A pixel electrode to be connected to a source electrode 107 is disposed through a through hole formed in an overcoat layer (interlayer separation film) 112. On the first substrate below the color filter layer 110 are provided plural scan signal electrodes, plural video signal electrodes crossing the scan signal electrodes in a matrix form, plural thin film transistors formed in association with the crossing points between the electrodes. Each pixel is provided with a common electrode 103 which is connected over plural pixels through a common electrode wire to supply reference potential, and a pixel electrode 114 which is connected to the corresponding thin film transistor and disposed so as to confront the common electrode in the pixel area.

18 Claims, 12 Drawing Sheets

U.S. PATENT DOCUMENTS

| | | |
|---|---|---|
| 4,083,099 A | 4/1978 | Yano et al. |
| 5,598,285 A | 1/1997 | Kondo et al. |
| 5,677,747 A | 10/1997 | Ishikawa et al. |
| 5,689,318 A | 11/1997 | Matsuyama et al. |
| 5,721,597 A | 2/1998 | Kakinuma et al. |
| 5,831,704 A | 11/1998 | Yamada et al. |
| 5,852,485 A | 12/1998 | Shimada et al. |
| 5,889,571 A | 3/1999 | Kim et al. |
| 6,005,650 A | 12/1999 | Kim et al. |
| 6,023,317 A | 2/2000 | Xu et al. |
| 6,097,454 A | 8/2000 | Zhang et al. |
| 6,111,625 A | 8/2000 | Ohta et al. |
| 6,160,604 A | 12/2000 | Murai et al. |
| 6,181,402 B1 | 1/2001 | Shim et al. |
| 6,198,520 B1 | 3/2001 | Kondo et al. |
| 7,046,321 B2 * | 5/2006 | Kikkawa et al. ............ 349/113 |

* cited by examiner

LIQUID CRYSTAL DISPLAY DEVICE AND METHOD OF MANUFACTURING THE SAME

CROSS REFERENCE TO RELATED APPLICATIONS

This application is a continuation of U.S. Ser. No. 09/852,077 filed on May 9, 2001 now abandoned, which is a divisional application of U.S. Ser. No. 09/363,868 filed on Jul. 29, 1999 now abandoned.

BACKGROUND OF THE INVENTION

1. Field of the Invention

The present invention relates to an active matrix type liquid crystal display device which thin film transistors (TFT) are arranged in a matrix form and these thin film transistors are used as switching elements.

2. Description of the Related Art

An active matrix type TFT (Thin Film Transistor: hereinafter abbreviated as "TFT") liquid crystal display device in which TFTs are formed in a matrix arrangement on a glass substrate and these TFTs are used as switching elements has been developed as a high-quality flat-face display. In a twisted nematic (hereinafter abbreviated as "TN") type active matrix crystal display device which has been hitherto widely used, transparent electrodes which are formed on two glass substrates so as to confront each other are used as electrodes for driving a liquid crystal layer. By applying a voltage to liquid crystal molecules which are arranged in parallel to the substrate surface under non-voltage application state (i.e., "white" display state), the direction of the orientation vector of the liquid crystal molecules varies from the "white" display state to the direction of the electric field in accordance with the applied voltage, whereby the "white" display state is gradually varied to a "black" display state.

However, the inherent behavior of the liquid crystal voltages under voltage-applied state causes a problem that the angle of visibility of the TN type liquid crystal display device is small. The problem that the angle of visibility is small is particularly remarkable in the rise-up direction of the liquid crystal molecules under a half tone display state.

A technique as disclosed Japanese Laid-open Patent Application No. Hei-4-261522 or Japanese Laid-open Patent Application No. Hei-6-43461 has been proposed as a method of improving the angle-of-visibility characteristic of the liquid crystal display device. According to these techniques, a liquid crystal cell in which liquid crystal molecules are homeotropically oriented is created, and it is sandwiched between two polarizing plates arranged so that the polarization axes thereof are perpendicular to each other. As shown in the drawings of the above publications, a slant electric field is generated in each pixel by using a common electrode having an opening portion to make two or more crystal liquid domains in each pixel, thereby enhancing the angle-of-visibility characteristic. In the Japanese Laid-open Patent Application No. Hei-4-261522, the slant direction of the liquid crystal molecules when the voltage is applied is particularly controlled to achieve high contrast.

Further, as disclosed in Japanese Laid-open Patent Application No. Hei-6-43461, an optical compensator is used to enhance the angle-of-visibility characteristic for black, as occasion demands. Further, in Japanese Laid-open Patent Application No. Hei-6-43461, for not only a homeotropically-oriented type of liquid crystal cell, but also a TN-oriented type liquid crystal cell, each pixel is divide into two or more domains by using slant electric field, thereby enhancing the angle-of-visibility characteristic.

Japanese Patent No. Hei-5-505247 proposes an IPS (In-Plane-Switching) type liquid crystal display device in which two electrodes are formed on one substrate and a voltage is applied across these two electrodes to generate electric field in parallel to the substrate in order to rotate the liquid crystal molecules while keeping the molecules in parallel to the substrate. According to this system, the major axis of each liquid crystal molecule is prevented from rising up with respect to the substrate when the voltage is applied. Therefore, the variation of the birefringence of the liquid crystal molecules when the direction of the visual angle is varied is small, and thus the angle of visibility is large.

An IPS type active matrix liquid crystal device in which both of two electrodes are provided on one of substrates as described above will be described hereunder. The IPS type TFT liquid crystal display device is constructed as shown in FIGS. 12A and 12B. FIG. 12A is a cross-sectional view taken along A-A' line of a plan view of FIG. 12B.

First, a gate electrode 1202 and a common electrode 1203 are formed of Cr on a glass substrate 1201, and then a gate insulating film 1204 of silicon nitride is formed so as to cover these electrodes 1202 and 1203. Then, a semiconductor film 1205 of amorphous silicon is formed through a gate insulating film 1204 on the gate electrode 1202, and it functions as an active layer of transistors. A drain electrode 1206 and a source electrode 1207 are formed of molybdenum so as to be superposed over a part of the pattern of the semiconductor film 1205, and a protection film 1208 of silicon nitride is formed so as to cover all the above elements.

As shown in FIG. 12B, a one-pixel area is disposed between the source electrode 1207 and the drawn-out common electrode 1203. Thereafter, an orientation film ORI 1 is formed on the surface of an active matrix substrate in which a plurality of unit pixels thus constructed are arranged in a matrix form. The surface of the orientation film IRI1 is subjected to a rubbing treatment.

Further, a color filter layer 1232 is formed on a counter substrate 1231 of glass so as to be partitioned by light shielding portions 1233, and a protection film 1234 is formed on these elements. An orientation film ORI2 is also formed on the surface of the protection film 1234, and the surface of the orientation film ORI2 is also subjected to the rubbing treatment.

The glass substrate 1201 and the counter substrate 1231 are disposed so that the orientation film ORI1 and the orientation film ORI2 are confronted to each other, and liquid crystal composition 1240 is disposed between the orientation films ORI1 and ORI2. Further, a polarizing plate 1251 is formed on each of the outer surfaces of the glass substrate 1201 and the counter substrate 1231. Each of the light shield portions 1233 through which the color filter layer 1232 is partitioned is partially disposed on a thin film transistor formed of the semiconductor layer 1205.

In the active matrix type liquid crystal display device thus constructed, when no electric field is applied to the liquid crystal composition 1240, liquid crystal molecules 1241a are kept to be substantially parallel to the extending direction of the electrodes, and homogeneously oriented. That is, the liquid crystal molecules 1241a are orientated so that the intersecting angle between the direction of the major axis (optical axis) of the liquid crystal molecules 1241a and the direction of the electric field formed between the source electrode 1207 and the drawn-out common electrode 1203 is set to a value in the range which is above 45° and less than 90°. The glass substrate 1201 and the counter substrate 1231 arranged so as to confront each other are disposed in parallel to the orientation direction of the liquid crystal molecules 1241a. The permittivity anisotropy of the liquid crystal molecules 1241a is set to a positive value.

Here, when a voltage is applied to the gate electrode 1202 to switch on the thin film transistor (TFT), a voltage is applied to the source electrode 1207 to induce electric field between the source electrode 1207 and the common electrode 1203 disposed so as to confront the source electrode 1207. The liquid crystal molecules 1241a are orientationally turned to liquid crystal molecules 1241b. The liquid crystal molecules 1241b are kept to be substantially parallel to the direction of the electric field generated between the source electrode 1207 and the common electrode 1203 disposed so as to confront the source electrode 1207.

By setting the polarization transmission axis of the polarizing plate 1251 at a predetermined angle, the transmittance of light can be varied by the movement of the liquid crystal molecules as described above.

As described above, with the IPS type active matrix liquid crystal display device, the contrast can be given without any transparent electrode.

In the IPS type TFT liquid crystal display device, the major axis of the liquid crystal molecules is substantially parallel to the flat surface of the substrate, and it does not rise up even when a voltage is applied. Therefore, variation in brightness when a viewing direction is varied is little, and thus the visual characteristic is greatly enhanced.

Further, a paper (Journal of Applied Physics, Vol. 45, No. 12 (1974) 5466) or Japanese Laid-open Patent Application No. Hei-10-186351 discloses such a system that liquid crystal molecules having positive permittivity anisotropy are homeotropically oriented perpendicularly to the substrate and these molecules are felled and put in parallel to the substrate by the electric field directing in parallel to the substrate, in addition to an IPS mode. At this time, the liquid crystal molecules which are homeotropically oriented due to the direction of the electric field are divided into two or more areas which are different in the slant direction of the liquid crystal molecules.

However, in the IPS system, the color filter layer is disposed between the liquid crystal layer and the counter substrate, and thus the electric field which will be formed when potential is applied between the source electrode and the drawn-out common electrode adversely affects the color filter layer and degrades the display characteristic of the active matrix type liquid crystal display device. That is, the pigments constituting the color filter layer contain sodium ions, etc., and thus when electric field is applied to the color filter layer, charges are trapped there and the color filter layer is charged up. When the color filter layer charges up, undesired electric field is applied to the liquid crystal molecules below the charge-up area of the color filter layer at all times, so that the display characteristic is adversely effected.

SUMMARY OF THE INVENTION

The present invention has been implemented to overcome the above problems, and has an object to provide a liquid crystal display device which can suppress occurrence of color shade.

Another object of the present invention is to provide a manufacturing method which can easily manufacture the liquid crystal display device.

In order to attain the above objects, according to a first aspect of the present invention, there is provided a liquid crystal display device including a transparent first substrate and a transparent second substrate, and a liquid crystal layer and a color filter layer sandwiched between the transparent first and second substrates, characterized in that the color filter layer is disposed on the first substrate; the liquid crystal layer is disposed between the color filter layer and the second substrate; a plurality of scan signal electrodes, a plurality of video signal electrodes crossing to the scan signal electrodes in a matrix form and a plurality of thin film transistors formed in association with the respective crossing points of the scan signal electrodes and the video signal electrodes are provided on the first substrate below the color filter layer; at least one pixel is constructed in each of areas surrounded by the plural scan signal electrodes and the plural video signal electrodes; each pixel has a common electrode which is commonly connected to plural pixels through common electrode wiring to supply reference potential to the pixels and a pixel electrode which is connected to the corresponding thin film transistor and disposed so as to confront the common electrode in a pixel area; the common electrode and the pixel electrode are disposed in different layers through an interlayer separation film of transparent insulating material; electric field having a component which is dominantly parallel to the first substrate is produced in the liquid crystal layer by applying a voltage across the common electrode and the pixel electrode; and the liquid crystal molecules before the voltage are oriented substantially in parallel to the first substrate.

According to a second aspect of the present invention, there is provided a liquid crystal display device including a transparent first substrate and a transparent second substrate, and a liquid crystal layer and a color filter layer sandwiched between the transparent first and second substrates, characterized in that the color filter layer is disposed on the first substrate; the liquid crystal layer is disposed between the color filter layer and the second substrate; a plurality of scan signal electrodes, a plurality of video signal electrodes crossing to the scan signal electrodes in a matrix form and a plurality of thin film transistors formed in association with the respective crossing points of the scan signal electrodes and the video signal electrodes are provided on the first substrate below the color filter layer; at least one pixel is constructed in each of areas surrounded by the plural scan signal electrodes and the plural video signal electrodes; each pixel has a common electrode which is commonly connected to plural pixels through common electrode wiring to supply reference potential to the pixels and a pixel electrode which is connected to the corresponding thin film transistor and disposed so as to confront the common electrode in a pixel area; the common electrode and the pixel electrode are disposed in different layers through an interlayer separation film of transparent insulating material; electric field having a component which is dominantly parallel to the first substrate is produced in the liquid crystal layer by applying a voltage across the common electrode and the pixel electrode; and the liquid crystal molecules before the voltage are oriented substantially vertically to the first substrate.

Accordingly, under the electric field produced by applying the voltage across the common electrode and the pixel electrode, the liquid crystal in the liquid crystal layer is automatically divided into two or more areas, and felled so as to be parallel to the substrate, so that the electric field occurring in the liquid crystal layer has no effect on the color filter layer.

In the liquid crystal display device of the present invention, at least one of the common electrode and the pixel electrode may be formed of a transparent conductive film in order to suppress reduction of the opening degree. Further, the liquid crystal display device may be designed so that the pixel electrode is formed of a transparent conductive film, the common electrode is formed of metal such as Cr or the like and the light shielding layer for shielding TFT from light is formed of the same layer as the common electrode.

Further, the liquid crystal display device of the present invention has at least one optical compensator between the polarizing plate and the liquid crystal cell to enhance the angle-of-visibility characteristic. An optically negative compensator is preferably used as the compensator from the viewpoint of offsetting the variation of retardation when the display device is viewed from a slant direction because the liquid crystal molecules under non-voltage application state are homeotropically oriented. The same effect can be obtained by forming the compensator of one film which is created by a biaxial stretching (orientation) method or the like, or by superposing two or more one-axially stretched (oriented) films on each other and using the result as a substantially optically negative one-axial compensator. Further, the initial orientation is set to the vertical orientation in principal, however, when the orientation direction is displaced to some direction due to characteristics of elements, a film having positive optical anisotropy may be attached to compensate the displacement.

Further, in the liquid crystal display device of the present invention, a transparent conductive film may be provided to the opposite side to the liquid crystal layer of the second substrate to avoid an adverse effect of static electricity or the like on the display.

According to a method of manufacturing a liquid crystal display device, an initial orientation is controlled by applying a voltage across a common electrode and a pixel electrode, and then polymerizable monomers or oligomers which are mixed in a small amount in liquid crystal are polymerized to make the initial orientation of the liquid crystal further sure. When the initial orientation is controlled, the temperature may be lowered while applying a voltage across the common electrode and the pixel electrode the liquid crystal layer is made isotropic by heating, or the voltage may be merely applied across the common electrode and the pixel electrode. Further, the reaction of the monomers may be induced before the liquid crystal layer is made isotropic by heating or during the heating. When the initial orientation is controlled by applying the voltage across the common electrode and the pixel electrode at room temperature, the reaction may be induced before the application of the voltage or after the application of the voltage.

Further, the method of manufacturing the liquid crystal display device according to the present invention, a pretilt angle control which is conformed with a divisional shape is beforehand performed on the substrate by a rubbing or optical orienting method, thereby making the control of the initial orientation extremely sure, and also in order to prevent disturbance of this orientation due to application of a driving voltage, polymerizable monomers or oligomers which are mixed in a small amount in liquid crystal are polymerized, thereby achieving more excellent effect. Still further, in the case of the optical orientation, the division can be more surely maintained under driving operation by polymerizing the polymerizable monomers or oligomers which are mixed in a small amount in the liquid crystal.

DETAILED DESCRIPTION OF THE PREFERRED MODES

Preferred modes according to the present invention will be described hereunder with reference to the accompanying drawings.

[First Mode]

Figure 1A:
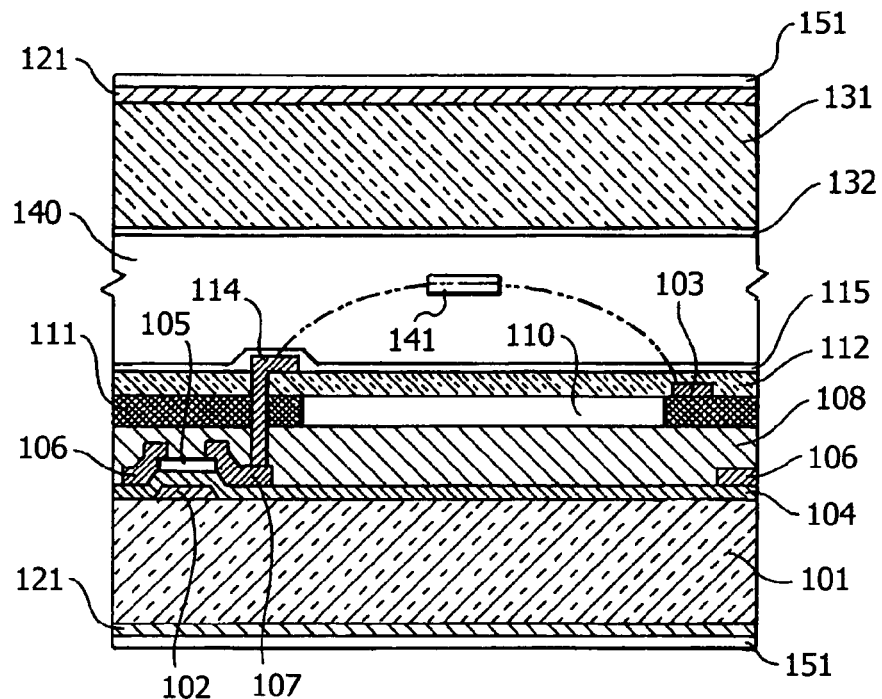
FIGS. 1A and 1B are cross-sectional view and plan view showing a liquid crystal display device according to a first mode of the present invention.
Figure 1B:
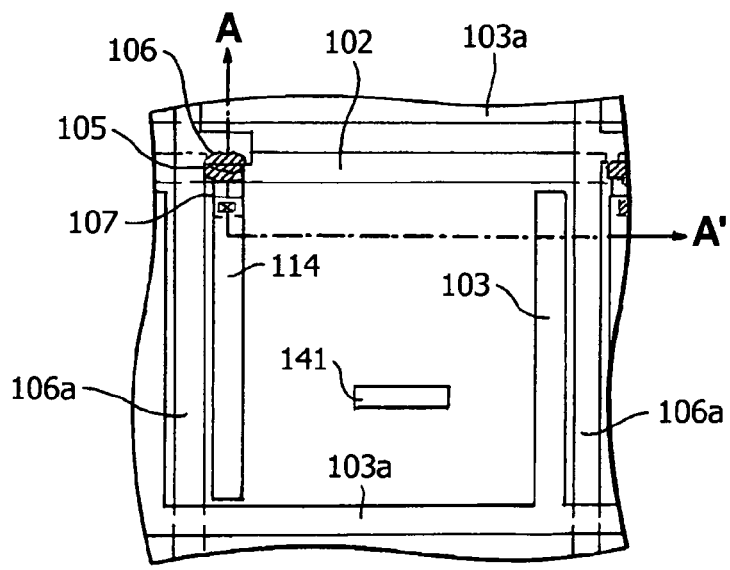

First, a liquid crystal display device according to a first mode will be described with reference to FIGS. 1A and 1B. FIG. 1A is a cross-sectional view of AA' line of a plan view of FIG. 1B.

In the liquid crystal display device according to the first mode, a gate electrode (scan signal electrode) 102 formed of Cr is disposed on a glass substrate 101, and a gate insulating film 104 of silicon nitride is formed so as to cover the gate electrode 102.

Further, a semiconductor film 105 of amorphous silicon is disposed through the gate insulating film 104 on the gate electrode 102, and it is designed to function as an active layer of a thin film transistor (TFT). Further, a drain electrode 106 and a source electrode 107 are formed of molybdenum so as to be overlapped with a part of the pattern of the semiconductor film 105, and a protection film 108 is formed of silicon nitride so as to cover all the above elements. As not shown, each of the drain electrode 106 and the source electrode 107 is overlapped with a part of the pattern of the semiconductor film 105 through an amorphous silicon film doped with n-type impurities. As show in FIG. 1B, the drain electrode 106 is connected to a data line (video signal electrode) 106a. In other words, the drain electrode 106 is formed as a part of the data line 106a.

In the first mode, a color filter layer 110 is disposed on the protection film 108 so as to be partitioned by a light shielding portion 111. The surfaces of the color filter layer 110 and the light shielding portion 111 are covered by an overcoat layer (interlayer separation film) 112. The overcoat layer 112 is formed of a transparent insulating material which is hard to charge up.

A pixel electrode 114 connected to the source electrode 107 through a through hole which is formed so as to penetrate through the protection film 108, the light shielding portion 111 and the overcoat layer 112 is disposed on the overcoat layer 112. On the plane, a common electrode 103 drawn out from a common electrode wire 103a is formed so as to confront the pixel electrode 114 in a one-pixel area. Here, the common electrode 103 is disposed on the light shielding portion 111 so as to be covered by the overcoat layer 112.

Accordingly, in the first mode, the common electrode 103 is disposed on the color filter layer 110, and the pixel electrode 114 is disposed on the overcoat layer 112 which is formed so as to cover the common electrode 103 and the color filter layer 110. Each pixel is formed in an area sandwiched between the pixel electrode 114 and the common electrode 103.

Further, an orientation film 115 is formed on the surface of the active matrix substrate in which the unit pixels are arranged in a matrix form as described above, that is, on the overcoat layer 112 having the pixel electrode 114 formed thereon. The surface of the orientation film 115 is subjected to the rubbing treatment.

An orientation film 132 is also formed on a counter substrate 131 of glass, and the surface of the orientation film 132 is also subjected to the rubbing treatment.

The glass substrate 101 and the counter substrate 131 are disposed so that the orientation film 115 and the orientation film 132 are confronted to each other, and a liquid crystal composition layer 140 is disposed between the counter substrate 131 and the orientation film 115. A polarizing plate 151 is formed on the outer surface of each of the glass substrate 101 and the counter substrate 131. The light shielding portion 111 through which the color filter layer 110 is partitioned is disposed so as to be partially superposed on each film transistor formed of the semiconductor film 105.

In the TFT liquid crystal device thus constructed, when no electric field is applied to the liquid crystal composition layer 140, the liquid crystal molecules in the liquid crystal composition layer 140 are kept substantially in parallel to the extending direction of the electrodes, and homogeneously orientated. That is, the liquid crystal molecules are oriented so that the intersection angle between the major axis (optical axis) of the liquid crystal molecules and the electric field direction formed between the pixel electrode 114 and the common electrode 103 is set to be above 45° and less than 90°, for example. The glass substrate 101 and the counter substrate 131 disposed so as to confront each other are in parallel to the orientation direction of the liquid crystal molecules. The permittivity anisotropy of the liquid crystal molecules is set to a positive value.

Here, when a voltage is applied to the gate electrode 102 to switch on the thin film transistor (TFT), a voltage is applied to the source electrode 107 to induce electric field between the pixel electrode 114 and the common electrode 103 disposed so as to confront the pixel electrode 114. The electric field keeps the liquid crystal molecules 141 substantially in parallel to the direction of the electric field formed between the pixel electrode 114 and the common electrode 103. By setting the polarization transmission axis of the polarizing plate 151 at a predetermined angle, the light transmittance can be varied due to the motion of the liquid crystal molecules as described above.

Next, a method of manufacturing the liquid crystal display device according to the first mode will be briefly described.

Figure 2A:
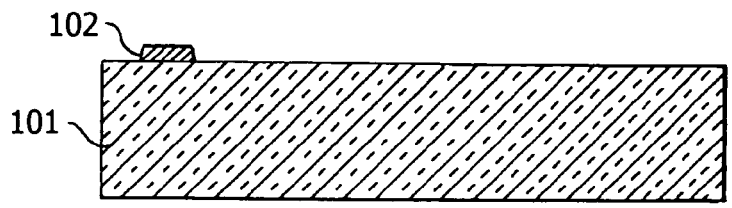
FIGS. 2A to 2E are cross-sectional views showing a manufacturing method of the liquid crystal display device according to the first mode.

A Cr film is first formed, and subjected to a patterning treatment by using well-known photolithography technique and etching technique, thereby forming the gate electrode on the glass substrate 101 as shown in FIG. 2A.

Figure 2B:
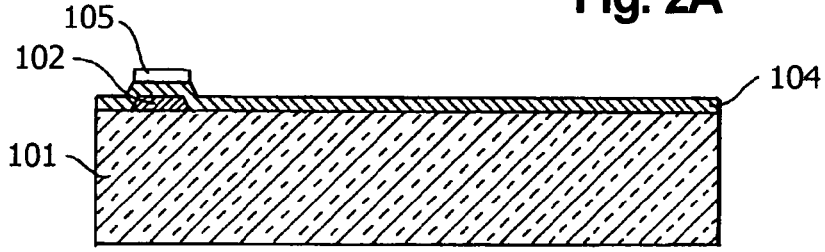

Subsequently, as shown in FIG. 2B, the gate insulating film 104 of silicon nitride is formed on the glass substrate 101 (and on the gate electrode 102), and the semiconductor film 105 of amorphous silicon is formed on the gate electrode 102 through the gate insulating film 104. The semiconductor film 105 may be formed by depositing amorphous silicon on the gate insulating film 104 and then patterning the amorphous silicon film by the well-known photolithography technique and etching technique.

Figure 2C:
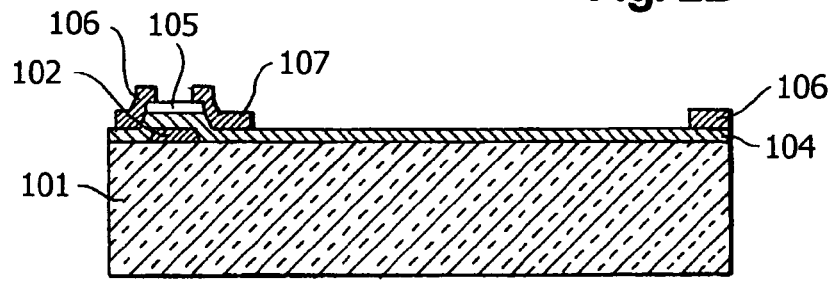
Figure 2D:
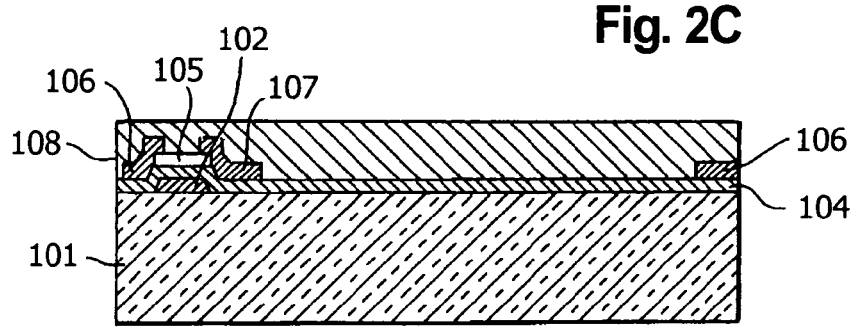

Subsequently, the drain electrode 106 and the source electrode 107 are formed of molybdenum so as to be overlapped with a part of the pattern of the semiconductor film 105 as shown in FIG. 2C. Thereafter, the protection film 108 is formed on the gate insulating film 104 so as to cover the drain electrode 106, the source electrode 107 and the semiconductor film 105 as shown in FIG. 2D.

Figure 2E:
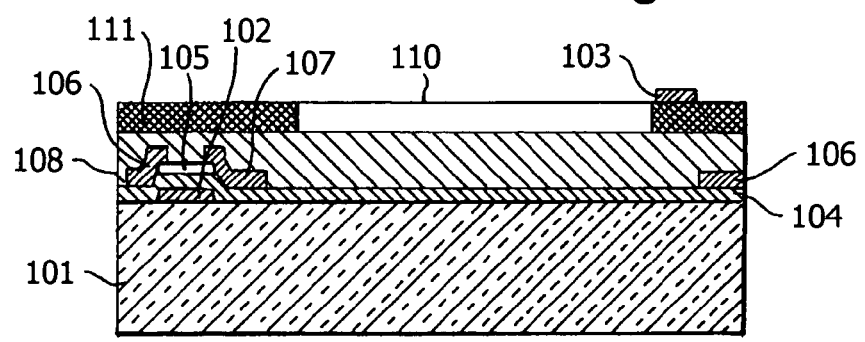

Subsequently, as shown in FIG. 2E, the color filter layer 110 and the light shielding portion 111 are formed on the protection film 108, and then the common electrode 103 of aluminum is formed on the light shielding portion 111 by the photolithography technique and the etching technique. The color filter layer 110 is formed of a resin film containing red, green or blue dye or pigment. The light shielding portion 111 may be formed of a resin film containing black dye or pigment. Alternatively, the light shielding portion my be formed of metal.

The color filter layer 110 may be formed by using a pigment-dispersed resist in which pigment having a desired optical characteristic such as red or the like is dispersed in negative type photosensitive resin containing acrylic resin as a base. First, the pigment-dispersed resist is coated on the protection film 108 to form a resist film thereof. Subsequently, the resist film is exposed to light by using a photomask so that the light is selectively irradiated to predetermined areas, that is, pixel areas arranged in a matrix form. After the exposure step, the result is developed with predetermined developing liquid to form a predetermined pattern. These steps are repeated three times for three colors of red, green and blue for example, thereby forming the color filter layer 110.

Figure 3F:
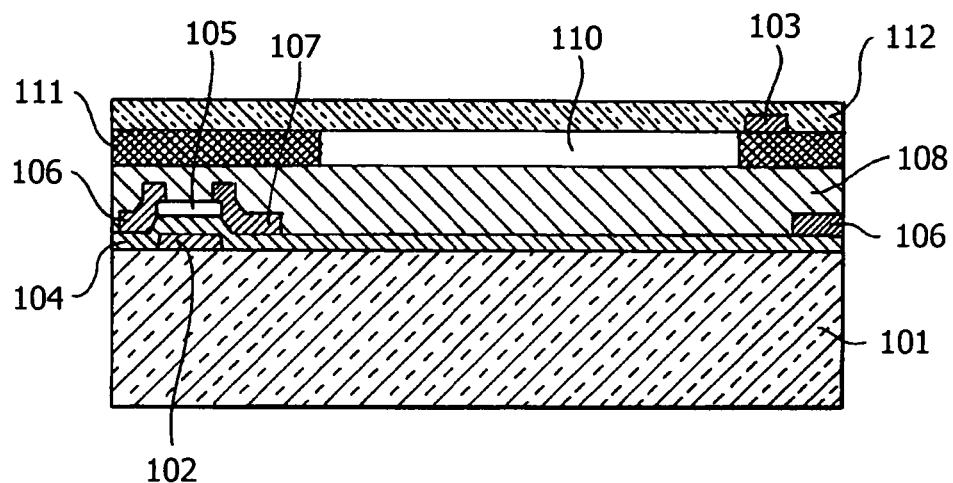
FIGS. 3F and 3G are cross-sectional views showing subsequent steps of the manufacturing method of FIGS. 2A to 2E.

Subsequently, an overcoat layer 112 of transparent insulating material is formed on the color filter layer 110 and the light shielding portion 111 as well as the common electrode 103 as shown in FIG. 3F. The overcoat layer 112 may be formed of thermosetting resin such as acrylic resin or the like. Alternatively, photocurable transparent resin may be used for the overcoat layer 112.

Figure 3G:
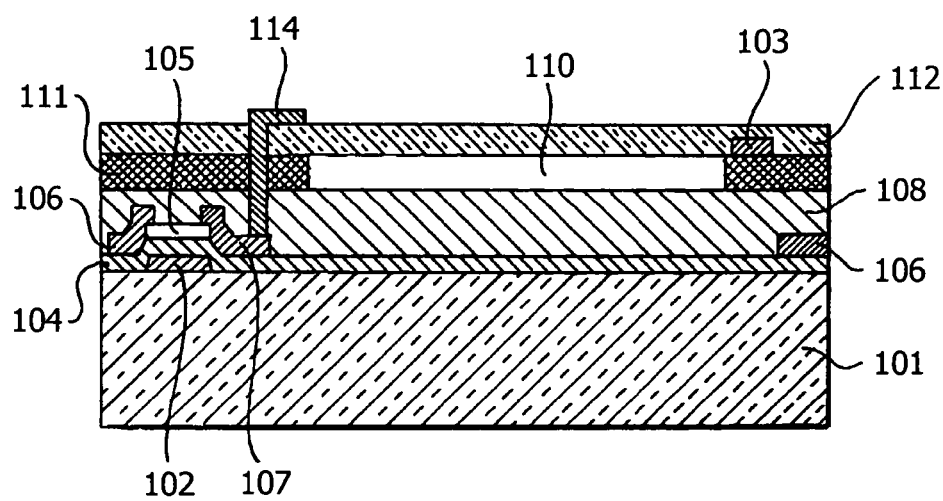

Subsequently, a through hole is formed and then the pixel electrode 114 to be connected to the source electrode 107 through the through hole is formed on the overcoat layer 112 as shown in FIG. 3G.

Thereafter, the orientation film 115 is formed, and then the liquid crystal composition layer 140 is formed. Besides, the polarizing plate 151 is formed on one surface of the counter substrate 131, and the orientation film 132 is formed on the opposite surface of the counter substrate 131 to the polarizing-plate formed surface. Thereafter, the liquid crystal composition layer 140 is hermetically filled between the glass substrate 101 and the counter substrate 131 through a sealing member containing a gap member, thereby completing the liquid crystal display device as shown in FIG. 1.

As described above, according to the first mode, electric field is formed between the pixel electrode 114 disposed on the color filter layer 110 and the common electrode 103 disposed so as to confront the pixel electrode 114, whereby the liquid crystal molecules 141 disposed on the above electrodes are driven.

Therefore, according to the first mode, the color filter layer 110 and the liquid crystal composition layer 140 are disposed so as to sandwich the pixel electrode 114 and the common electrode 103 therebetween. Accordingly, the electric field which is induced by the pixel electrode 114 and the common electrode 103 to move the liquid crystal molecules 141 has no effect on the color filter layer 110.

Above the common electrode 103, the liquid crystal composition layer 140 is formed on the overcoat layer 112, however, the overcoat layer 112 is little charged up.

As described above, according to the first mode, it is prevented from applying undesired electric field to the liquid crystal composition layer 140 from the upper and lower sides, so that the deterioration of the display characteristic can be suppressed unlike the prior art.

Further, the pixel electrode 114 and the common electrode 103 and the common electrode wire 103a are formed through the overcoat layer 112, and the pixel electrode 114 and the common electrode wire 103a are prevented from coming into contact with each other.

[Second Mode 2]

Figure 4A:
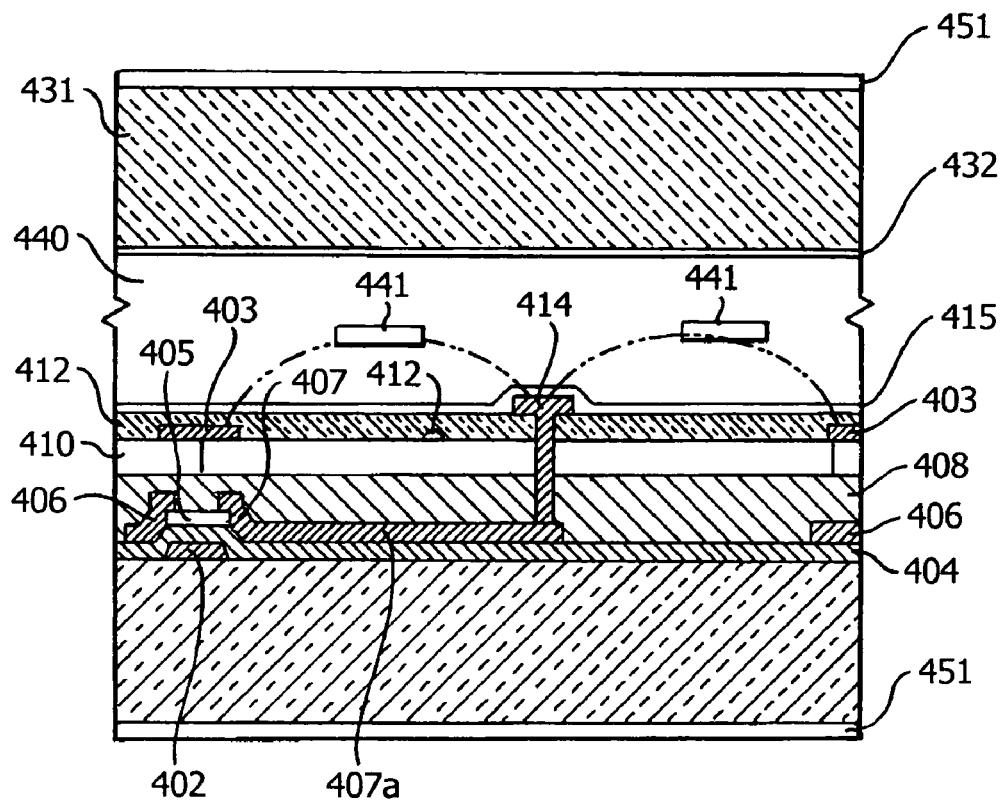
FIGS. 4A and 4B are cross-sectional view and plan view showing a liquid crystal display according to a second mode of the present invention.
Figure 4B:
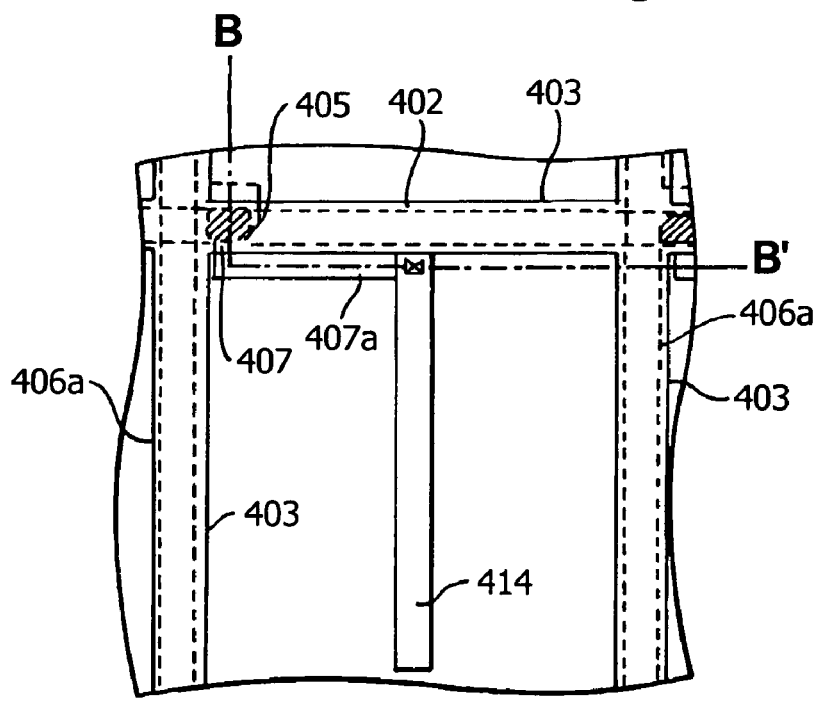

First, a liquid crystal display device according to a second mode of the present invention will be described with reference to FIGS. 4A and 4B. FIG. 4A is a cross-sectional view of BB' line of FIG. 4B.

In the liquid crystal display device of the second mode, a gate electrode 402 of Cr is disposed on a glass substrate 401, and a gate insulating film 404 of silicon nitride so as to cover the gate electrode 402.

A semiconductor film 405 of amorphous silicon is disposed on the gate electrode 402 through the gate insulating film 404, and it functions as an active layer of the thin film transistor.

A drain electrode 406 and a source electrode 407 are formed of molybdenum so as to be overlapped with a part of the pattern of the semiconductor film 405, and a protection film 408 of silicon nitride is formed so as to cover all the above electrodes. As not shown, each of the drain electrode 406 and the source electrode 407 is overlapped with a part of the pattern of the semiconductor film 405 through an amorphous silicon film doped with n-type impurities. As shown in FIG. 4B, the drain electrode 406 is connected to a data line 406a. The above structure is the same as the first mode.

In the second mode, the color filter layer 410 is disposed on the protection film 408, and the color filter layer 410 is covered by the overcoat layer 412. The overcoat layer 412 is formed of transparent material such as acrylic resin or the like which is hard to charge up.

A pixel electrode 414 is disposed on the overcoat layer 412 so as to be connected to a draw-out electrode 407a drawn out from the source electrode 407. The pixel electrode 414 is connected to the draw-out electrode 407a through a through hole which penetrates through the protection film 408, and the overcoat layer 412. The pixel electrode 414 is formed of a transparent electrode of ITO ($In_2O_3$:Sn), and it is disposed at the center of a one-pixel area so as to divide the one-pixel area into substantially equal two parts.

Further, the common electrode wire 403 is formed so as to surround the one-pixel area. The common electrode wire 403 is disposed on the color filter layer 410 so as to be covered by the overcoat layer 412. Viewed from the upper side, the common electrode wire 403 is disposed so as to hide the drain electrode 406, the data line 406a, the source electrode 407 and the gate electrode 402 disposed as the lower layers of the common electrode wire 403 and the TFTs constructed by the above elements, whereby the common electrode wire 403 also serves as a light shielding layer.

An orientation film 415 is formed on the surface of the active matrix substrate in which the unit pixels thus constructed are arranged in a matrix form, that is, on the overcoat layer having the pixel electrode 414 formed thereon. The surface of the orientation film 415 is subjected to the rubbing treatment.

In addition, an orientation film 432 is formed on a counter substrate 41 of glass, and the surface of the orientation film 432 is subjected to the rubbing treatment. The glass substrate 401 and the counter substrate 431 are disposed so that the orientation film 415 and the orientation film 432 are confronted to each other, and a liquid crystal composition layer 440 is disposed between the orientation film 415 and the orientation film 432. Further, a polarizing plate 451 is formed on the outer surface of each of the glass substrate 401 and the counter substrate 431.

As described above, in the second mode, as in the case of the first mode, the common electrode wire 403 is disposed on the color filter layer 410, and the pixel electrode 414 is disposed on the overcoat layer 412 which is formed so as to cover the common electrode wire 403 and the color filter layer 410. In this case, the common electrode wire 403 also serves as a common electrode as in the case of the first mode. Further, in the second mode, each pixel is constructed by an area surrounded by the common electrode wire 403 formed in a grid shape, and the pixel electrode 414 is disposed so as to pass through the center portion of the area and partition the area into equal two parts.

In the TFT liquid crystal display device thus constructed, when no electric field is applied to the liquid crystal composition layer 440, the liquid crystal molecules in the liquid crystal composition layer 440 are kept substantially in parallel to the extending direction of these electrodes. That is, the liquid crystal molecules are disposed so that the intersecting angle between the direction of the major axis (optical axis) of the liquid crystal molecules and the direction of the electric field formed between the pixel electrode 414 and the common electrode wire 403 is set to be above 45 degrees and less than 90 degrees. The orientation direction of the glass substrate 401 and the counter substrate 431 disposed so as to confront each other is set to be parallel to the orientation direction of the liquid crystal molecules. The permittivity anisotropy of the liquid crystal molecules is set to a positive value.

Here, when a voltage is applied to the gate electrode 402 to switch on the thin film transistor (TFT), the voltage is applied to the source electrode 407 to induce the electric field between the pixel electrode and the common electrode wire 403 disposed so as to confront the pixel electrode 414. The electric field keeps the liquid crystal molecules 441 substantially in parallel to the direction of the electric field formed between the pixel electrode 414 and the common electrode wire 403. By disposing the polarization transmission axis of the polarizing plates 451 at a predetermined angle, the light transmittance can be varied due to the motion of the liquid crystal molecules as described above.

As described above, in the second mode, the electric field is formed between the pixel electrode 414 disposed on the color filter layer 410 and the common electrode wire 403 disposed so as to confront the pixel electrode 414, thereby driving the liquid crystal molecules 441 disposed on these electrodes.

That is, in the second mode, the color filter layer 410 and the liquid crystal composition layer 440 are disposed so as to sandwich the pixel electrode 414 and the common electrode wire 403 therebetween. Accordingly, the electric field which is formed by the pixel electrode 414 and the common electrode wire 403 to move the liquid crystal molecules 441 has no effect on the color filter layer 410.

Above the common electrode wire 403, the liquid crystal composition layer 440 is formed on the overcoat layer 412, however, the overcoat layer 412 is little charged up.

As described above, according to the second mode, it can be prevented that undesired electric field is applied to the liquid crystal composition layer 440 from the upper and lower sides at all times. Therefore, unlike the prior art, the deterioration of the display characteristic can be suppressed.

The pixel electrode 414 and the common electrode wire 403 are formed through the overcoat layer 412, so that the pixel electrode 414 and the common electrode wire 403 are prevented from coming into contact with each other. According to the second mode, the common electrode wire 403 serves as a light shielding layer, so that the manufacturing process of the color filter layer can be simplified.

According to the first and second modes, a pair of common electrode and pixel electrode are provided for one pixel, however, the present invention is not limited to the above modes. Plural pairs of common electrodes and pixel electrodes may be provided in each pixel area. For example, the electrodes may be designed in a comb-shape and disposed so as to confront each other. With this structure, the distance between the pixel electrode and the common electrode can be shortened even when each pixel is large, and thus the voltage applied to drive the liquid crystal can be reduced.

[Third Mode]

Figure 5A:
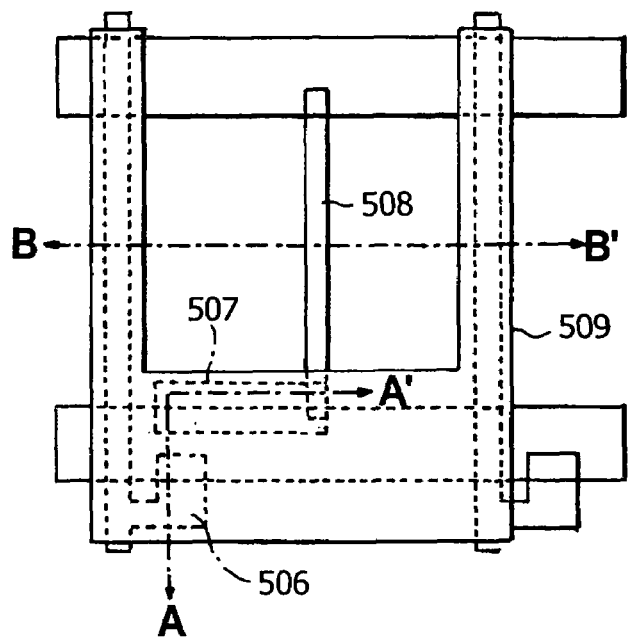
FIGS. 5A to 5C are plan view and cross-sectional view showing the construction of a liquid crystal display device according to a third mode of the present invention.
Figure 5B:
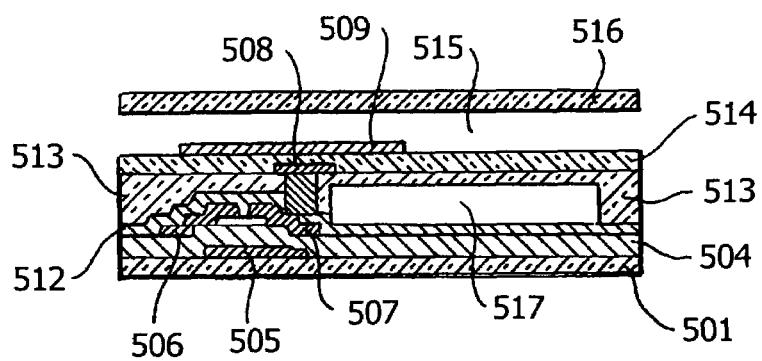
Figure 5C:
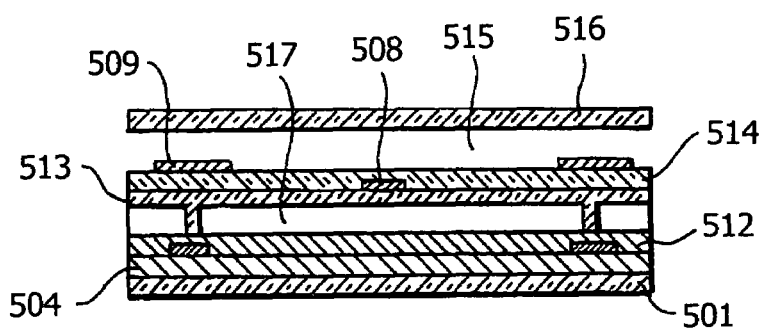

Next, a liquid crystal display device according to a third mode of the present invention will be described with reference to FIGS. 5A to 5C. FIG. 5A is a plan view showing some pixels of the liquid crystal display device, and FIGS. 5B and 5C are cross-sectional views taken along A-A' line and B-B' line of FIG. 5A.

The liquid crystal display device of the third mode is the same as the first mode in that a gate electrode 505 is formed on a glass substrate 501, a thin film transistor comprising a drain electrode 506 and a source electrode 507 is formed through a gate insulating film 504, and a passivation film 512 is formed on the thin film transistor. Further, a color filter layer 517 is formed on the passivation film 512, and a first overcoat layer 513 is formed so as to cover the color filter layer 517. The overcoat layer 513 is formed of a transparent insulating film which is hard to be charged up.

On the first overcoat layer 513 is disposed a pixel electrode 508 connected to the source electrode 507 through a through hole which is formed so as to penetrate through the passivation film 512 and the first overcoat layer 513.

A second overcoat layer 514 is further formed so as to cover all the above elements, and a common electrode 509 drawn out through a common electrode wire is formed on the second overcoat layer 514. Here, in order to enable the electric field between the common electrode 509 and the pixel electrode to be applied to the liquid crystal layer 515, the second overcoat layer 513 is preferably made thin so as to have a thickness of about 0.1 to 1 μm, and further it may be formed of a material having a high permittivity (dielectric constant).

Accordingly, in the third mode, the pixel electrode 508 is provided on the first overcoat 513 disposed on the color filter 517, and the common electrode 509 is disposed on the second overcoat layer which is formed so as to cover the above elements. The gap between the pixel electrode 508 and the common electrode 509 forms one pixel. The common electrode 509 is disposed on the wire and TFT, and it serves as a light shielding member as in the case of the second mode.

The third mode is similar to the first mode in that the orientation films are formed on the surface of the active matrix substrate on which the unit pixels designed as described above are disposed in a matrix arrangement and on the surface of the counter substrate, both the substrates are subjected to rubbing treatment in a predetermined direction and the liquid crystal is driven by using laterally-directing electric field occurring between the pixel electrode 508 and the common electrode 509 disposed on the active matrix substrate to thereby vary the light transmissivity. The liquid crystal layer 515 is sandwiched between the counter substrate 516 and the second overcoat layer 514.

Next, a method of manufacturing the liquid crystal display device according to the third mode described above will be briefly described.

Figure 6A:
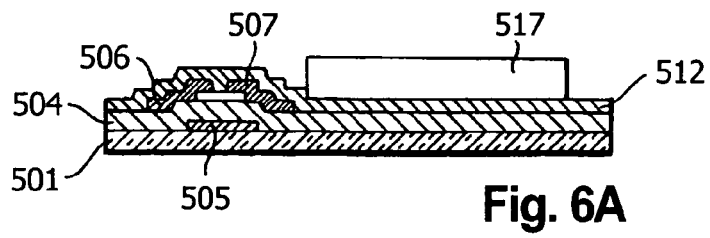
FIGS. 6A to 6E are cross-sectional view showing a method of manufacturing a liquid crystal display device according to the third mode.

As in the case of the first mode, as shown in FIG. 6A, a thin film transistor is formed on the glass substrate, the passivation film 512 for protecting the thin film transistor and the glass substrate 501 is deposited, and then a color filter layer 517 is formed by using pigment-dispersed type photosensitive acrylic resin or the like.

Figure 6B:
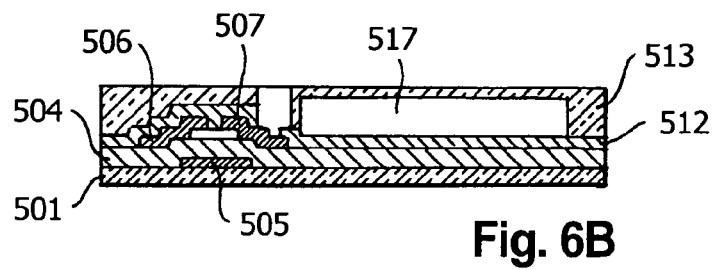

Subsequently, as shown in FIG. 6B, the first overcoat layer 513 is formed by using transparent photosensitive acrylic resin or the like, a through hole 518 is formed in the first overcoat layer 513 and at the same time a through hole is formed on the passivation film 512.

Figure 6C:
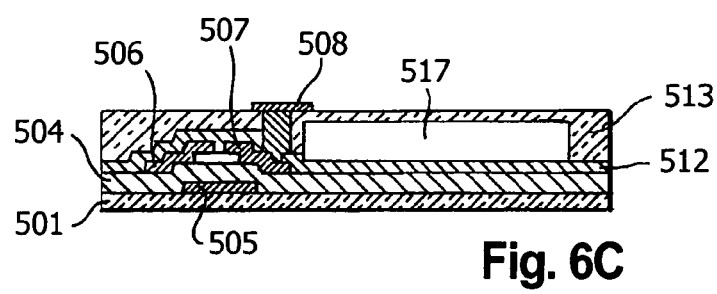

Subsequently, as shown in FIG. 6C, the pixel electrode 508 to be connected to the source electrode 507 through the through hole 518 is formed on the first overcoat layer 513 by using ITO or the like.

Figure 6D:
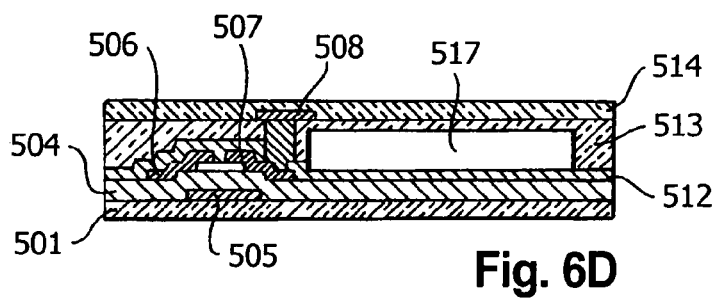

Subsequently, as shown in FIG. 6D, the second overcoat layer 514 is formed. When the second overcoat layer 514 is formed of a photosensitive organic film by using a coating method or the like, the through hole 518 is flattened, and both of the pixel electrode 508 and the common electrode 509 can be prevented from being short-circuited to each other. Therefore, this method is preferable.

Figure 6E:
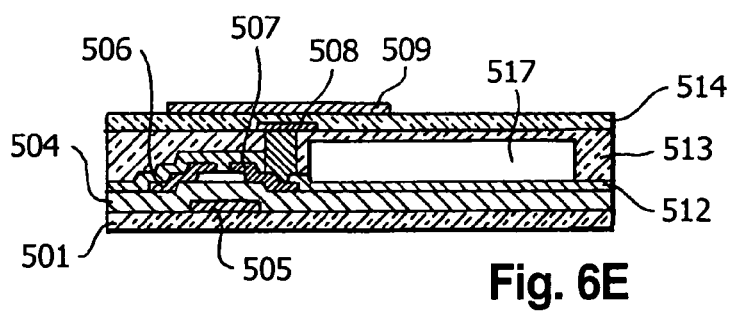

Thereafter, as shown in FIG. 6E, the common electrode 509 is formed of chrome/molybdenum or the like.

As described above, according to the third mode, undesired electric field is prevented from being applied to the liquid crystal layer 515 from the upper and lower sides at all times, and thus the device of the third mode has such a structure that the display deterioration hardly occurs unlike the prior art. Further, since the through hole on the first overcoat layer 513 is flattened by the second overcoat layer 514, the short-circuit between the pixel electrode 508 and the common electrode 509 can be prevented.

[Fourth Mode]

Figure 7A:
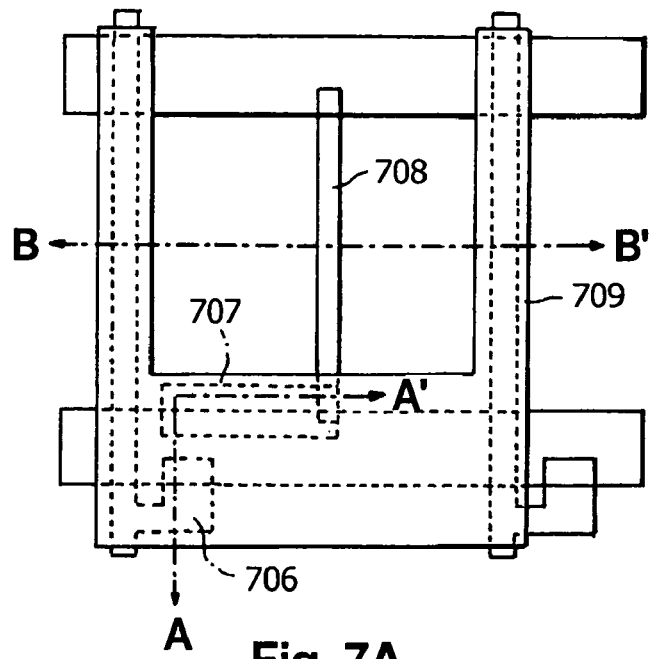
FIGS. 7A to 7C are plan view and cross-sectional view showing the construction of a liquid crystal display device according to a fourth mode of the present invention.
Figure 7B:
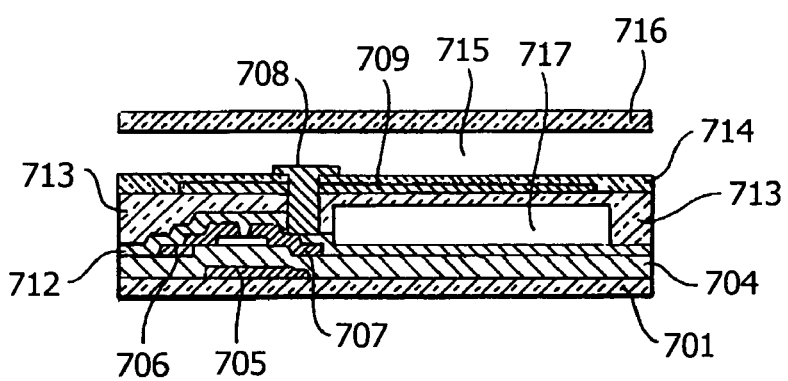
Figure 7C:
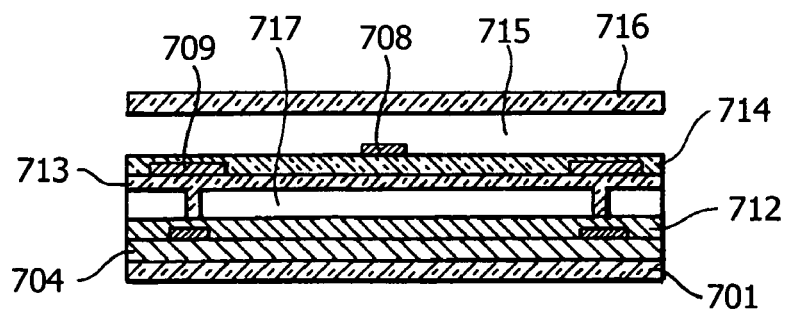

Next, the liquid crystal display device according to the fourth mode of the present invention will be described with reference to FIG. 7. FIG. 7A is a plan view showing some pixel of the liquid crystal display device, and FIGS. 7B and 7C are cross-sectional views taken along A-A' line and B-B' line of FIG. 7A, respectively.

In the liquid crystal display device according to the fourth mode of the present invention, the manufacturing processing thereof is the same as the first mode in that a gate electrode 705 is formed on a TFT glass substrate, a thin film transistor comprising a drain electrode 706 and a source electrode 707 is formed through a gate insulating film 704, and a passivation film 712 is formed on the thin film transistor. A color filter layer 717 is formed on the passivation film 712, and a first overcoat layer 713 is formed so as to cover the color filter layer 717. The overcoat layer 713 is formed of a transparent insulting material which is hardly charged up. A common electrode 709 drawn out through a common electrode wire is formed on the passivation film 712 and the first overcoat layer 713. Further, a second overcoat layer 714 is formed so as to cover the above elements, and a pixel electrode to be connected to the source electrode 707 through a through hole penetrating through the second overcoat layer is disposed.

Here, in order to enable the electric field between the common electrode and the pixel electrode from being applied to the liquid crystal layer 715, it is preferable that the second overcoat layer is made thin so as to have a thickness of about 0.1 to 1 μm and formed of a material having a high permittivity.

Accordingly, in the fourth mode, the common electrode 709 is disposed on the first overcoat 713 on the color filter 717, and the pixel electrode 708 is disposed on the second overcoat layer 714 formed so as to cover the first overcoat 713 and the common electrode 709. The area sandwiched between the pixel electrode 709 and the common electrode 709 forms one pixel. The common electrode 709 is disposed on the wire and TFT, and it serves as a light shielding member as in the case of the second mode.

The fourth mode is similar to the first mode in that the orientation films are formed on the surface of the active matrix substrate on which the unit pixels designed as described above are disposed in a matrix arrangement and on the surface of the counter substrate, both the substrates are subjected to rubbing treatment in a predetermined direction and the liquid crystal is driven by using laterally-directing electric field occurring between the pixel electrode and the common electrode disposed on the active matrix substrate to thereby vary the light transmissivity. The liquid crystal layer 715 is sandwiched between the counter substrate 716 and the second overcoat layer 714.

Next, a method of manufacturing the liquid crystal display device according to the fourth mode described above will be briefly described.

Figure 8A:
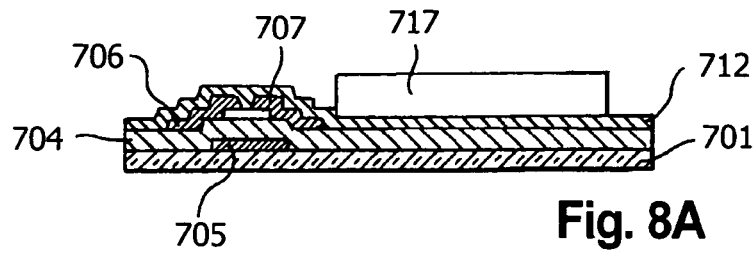
FIGS. 8A to 8E are cross-sectional views showing a method of manufacturing a liquid crystal display device according to the fourth mode.

As in the case of the first mode, as shown in FIG. 8A, a thin film transistor is formed on the glass substrate 710, the passivation film 712 for protecting the thin film transistor and the glass substrate is deposited, and then a color filter layer 717 is formed by using pigment-dispersed type photosensitive acrylic resin or the like.

Figure 8B:
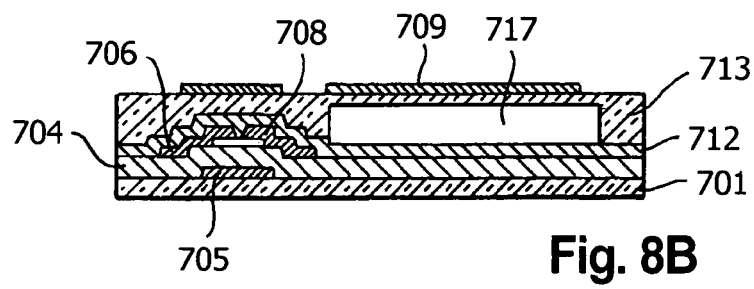

Subsequently, as shown in FIG. 8B, after the first overcoat layer 713 is coated, the common electrode 709 is patterned by using metal such as chromium/molybdenum or the like.

Figure 8C:
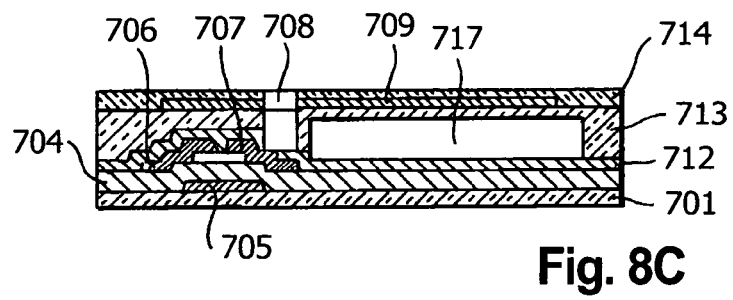

Subsequently, as shown in FIG. 8C, after the second overcoat layer 714 is coated, the through hole penetrating trough the first and second layers 713, 714 and the passivation films 712 is formed.

Figure 8D:
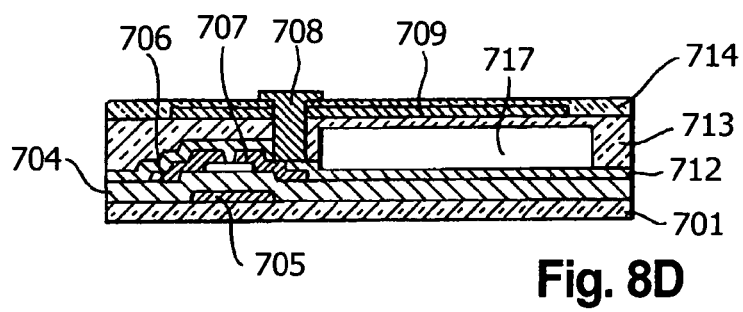
Figure 8E:
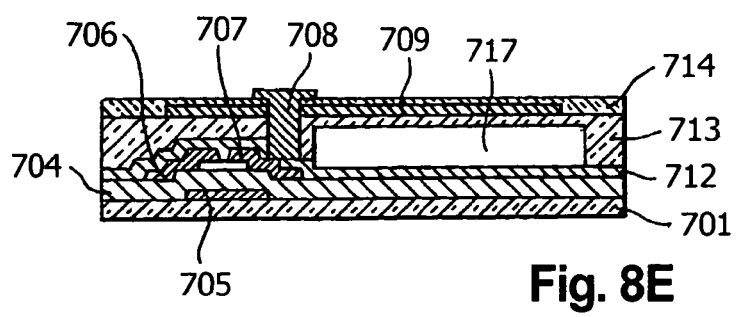

Finally, as shown in FIG. 8D, the pixel electrode 708 to be connected to the source electrode 707 through the through hole 718 is formed on the second overcoat layer 714 by using ITO or the like.

As described above, according to the fourth mode of the present invention, the liquid crystal layer 715 has such a structure that the display degradation hardly occurs unlike the prior art because undesired electric field can be prevented from being applied to the liquid crystal layer 715 from both the upper and lower sides at all times. Further, the through hole is formed by collectively performing patterning treatment on the first and second overcoat layer, so that the number of manufacturing steps is smaller than that of the third mode.

[Fifth Mode]

Figure 9A:
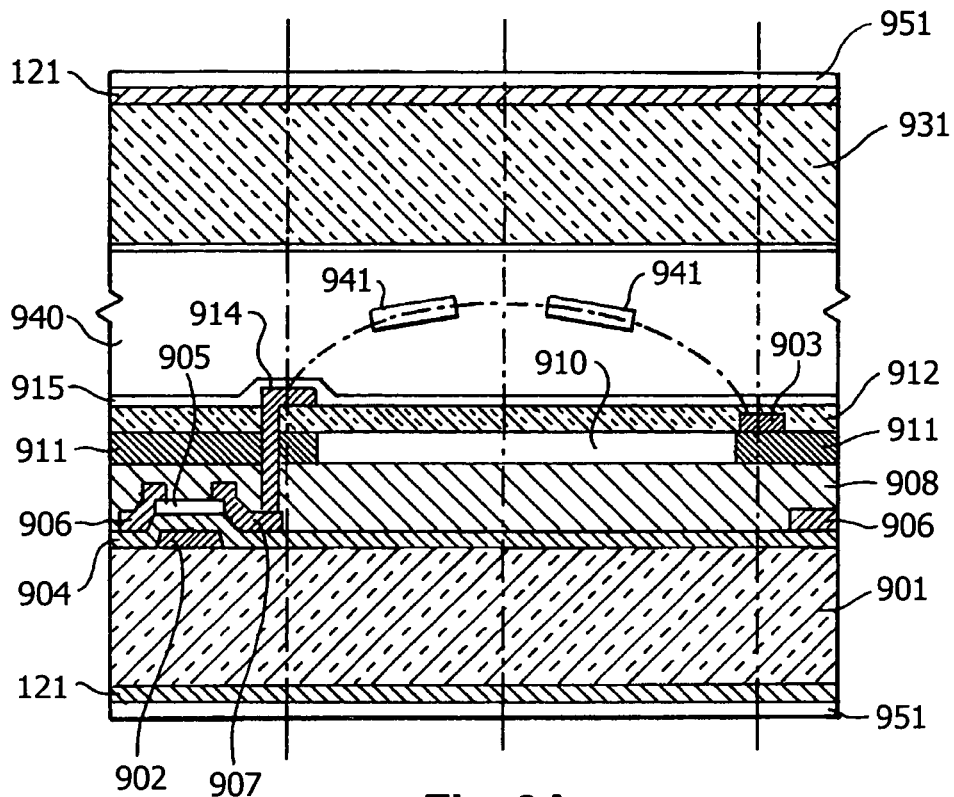
FIGS. 9A and 9B are plan view and cross-sectional view showing the construction of a liquid crystal display device according to a fifth mode of the present invention.
Figure 9B:
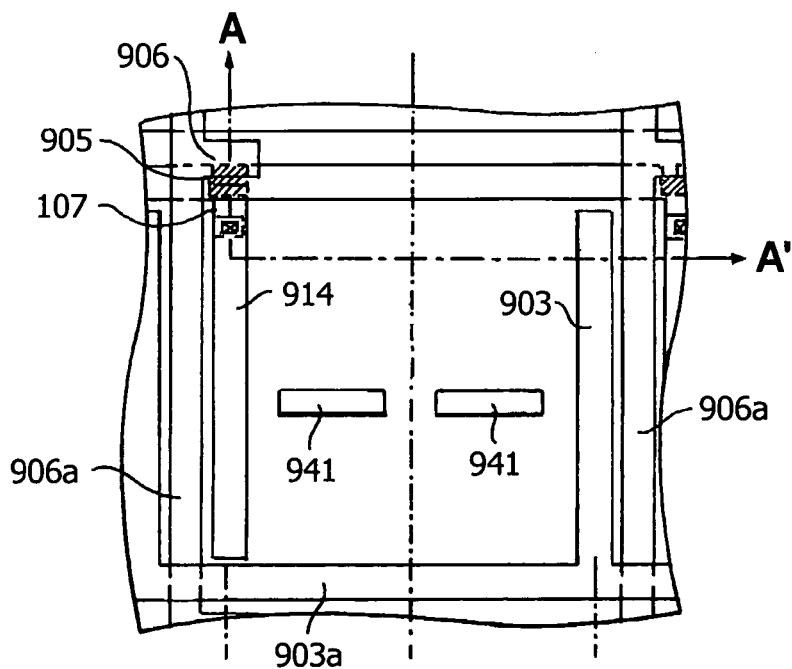

Next, a liquid crystal display device according to a fifth mode of the present invention will be described with reference to FIGS. 9A and 9B. FIG. 9A is a cross-sectional view taken along A-A' line of a plan view of FIG. 9B.

A vertical orientation film 915 is formed on the surface of the active matrix substrate on which the unit pixels designed in the same manner as the first mode are disposed in a matrix arrangement, that is, on the overcoat layer 912 on which the pixel electrode 914 is formed. The surface of the orientation film 915 may be subjected to the rubbing treatment or the optical orientation processing, if necessary.

Further, a vertical orientation film 932 is also formed on a counter substrate 931 formed of a transparent substrate, and the rubbing or optical orientation treatment is conducted on this orientation film 932, as occasion demands. In order to prevent degradation of image quality due to static electricity, a transparent conductive film such as ITO or the like may be provided on the opposite surface of the counter substrate to the orientation-film provided surface.

The substrate 901 and the counter substrate 931 are disposed so that the surfaces thereof on which the orientation film 915 and the orientation film 932 are formed respectively are confronted to each other, and a liquid crystal layer 940 is disposed therebetween. When the display device is used as a transmission type, a polarizing plate 951 is formed on the outer surface of each of the substrate 901 and the counter substrate 931. The light shielding portion 911 through which the color filter 910 is partitioned is formed so that a partial area thereof is disposed on the thin film transistor formed of the semiconductor film 905.

In the active matrix type liquid crystal display device thus constructed, when no electric field is applied to the liquid crystal layer 940, the liquid crystal molecules in the liquid crystal layer 940 are oriented substantially vertically to the substrates. The permittivity anisotropy of the liquid crystal is set to a positive value.

Here, when a voltage is applied to the gate electrode 902 to switch on the thin film transistor (TFT), a voltage is applied to the source electrode 907, and electric field is induced between the pixel electrode 914 and the common electrode 903 disposed so as to confront the pixel electrode 914. The electric field fells the liquid crystal molecules 941 substantially in parallel to the direction of the electric field formed between the pixel electrode 914 and the common electrode 903, that is, the substrate direction.

At this time, since the direction of the electric field is not perfectly parallel to the substrate, the liquid crystal molecules between the electrodes are separately felled in two directions.

As described above, according to the manufacturing method of the present invention, the direction in which the liquid crystal molecules are felled can be automatically divided into two directions without applying any special treatment on the orientation film, thereby achieving a wide angle of visibility.

However, the areas in which the liquid crystal molecules are felled in different directions (hereinafter referred to as "molecule-felling area") are controlled by only the direction of the electric field, and they are not clearly separated from each other. Therefore, when the orientation state of the liquid crystal is bad, the boundary between these areas may be shifted within a pixel in some display frames, resulting in occurrence of display failure.

Therefore, in order to more perfectly control the boundary at which the felling direction of the liquid crystal molecules is varied, the boundary may be fixed in the following manner.

As a method of fixing the boundary, rubbing treatment which is varied every area may be performed as shown in FIG. 10.

Figure 10A:
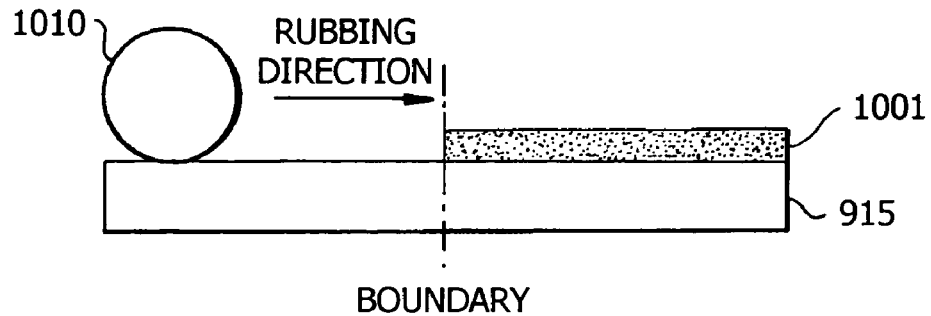
FIGS. 10A to 10C are step diagrams showing a method of rubbing treatment in the fifth mode.

First, as shown in FIG. 10A, a resist pattern 1001 is formed on the vertical orientation film 915 on one of different molecule-felling areas within the pixel, and a rubbing roll 1010 is shifted in a predetermined direction under the above state. Accordingly, an area of the vertical orientation film 915 which is not covered by the resist pattern 1001 is subjected to the rubbing treatment in the predetermined direction. However, in this step, the area covered by the resist pattern 1001 is not subjected to the rubbing treatment.

Figure 10B:
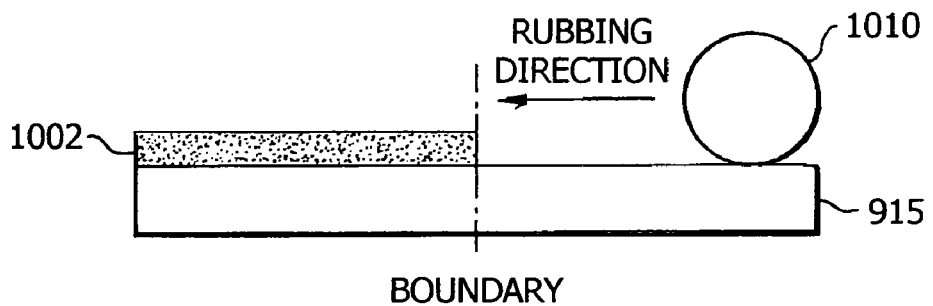

Subsequently, after the resist pattern 1001 is removed, as shown in FIG. 10B, a resist pattern 1002 is formed on the vertical orientation film 915 on the other molecule-felling area within the pixel. That is, the resist pattern 1002 is formed so as to cover the area which has been subjected to the rubbing treatment. Under this state, the rubbing roll 1010 is shifted in the opposite direction to the above direction.

Through the above operation, the area which is not covered by the resist pattern 1002 of the vertical orientation film 915 is subjected to the rubbing treatment in a direction different from that of the area which has been subjected to the rubbing treatment. In this rubbing treatment, the area which has been already subjected to the rubbing treatment is covered by the resist pattern 1002, and thus this area is prevented from being subjected to the rubbing treatment again.

Figure 10C:
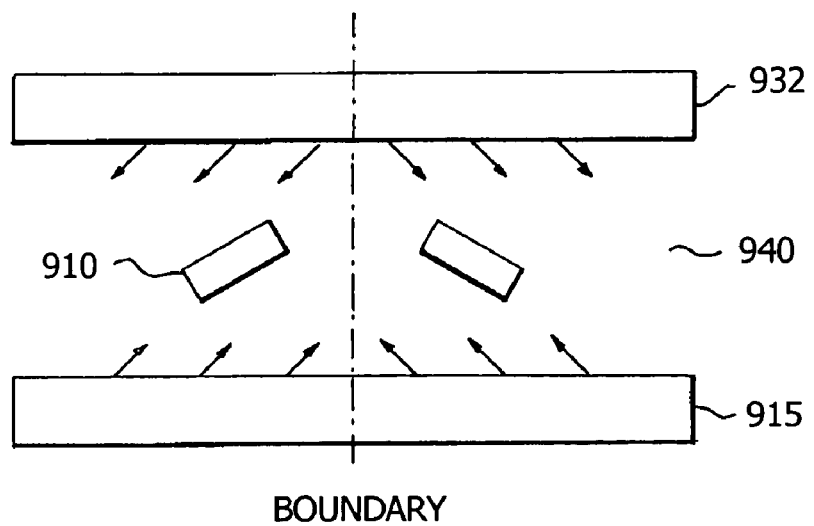

After the resist pattern 1002 is removed, the vertical orientation film 932 of the counter substrate 931 is subjected to the same treatment, and the liquid crystal layer 940 is disposed between these substrates as shown in FIG. 10C. As a result, the liquid crystal molecules 941 are felled in the different directions with respect to the boundary. That is, the divisional areas can be fixed as described above.

In order to more perfectly control the boundary at which the felling direction of the liquid crystal molecules is varied, the boundary may be fixed by the following methods. These two methods are based on use of an optical orientation film whose orientation direction is settled by irradiating polarized light.

Figure 11A:
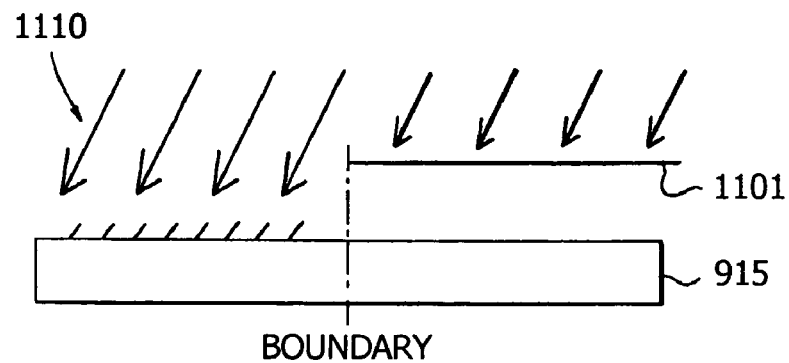
FIGS. 11A to 11C are step diagrams showing another method of the rubbing treatment of the fifth mode.

More specifically, as shown in FIG. 11, when a vertical orientation film 915 formed of an optical orientation film is formed, a mask 1101 is disposed to light-shield one molecule-felling area with respect to a specific boundary, and under this state polarized light 1110 is irradiated from the upper slant direction, thereby setting the orientation state of an area which is not covered by the mask 1101 of the vertical orientation film 915. However, in this step, the orientation state is not set to the area covered by the mask 1101.

Figure 11B:
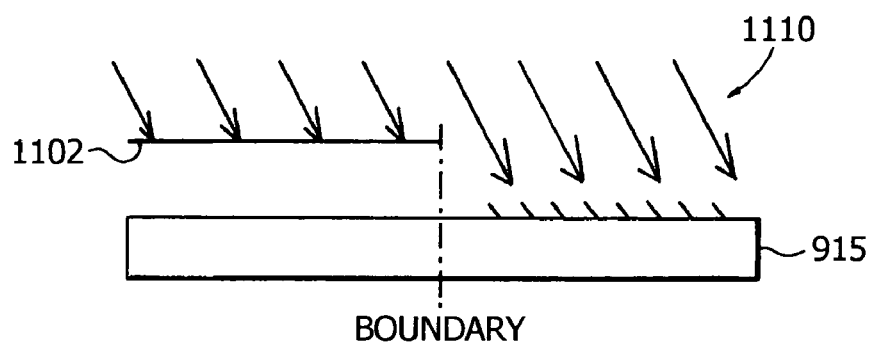

Subsequently, as shown in FIG. 11B, a mask 1102 is disposed on the vertical orientation film 915 on the other area with respect to the boundary within the pixel. That is, the mask 1102 is disposed so as to cover the area whose orientation state has been already set. Under this state, polarized light is irradiated from the slant upper direction opposite to the above slant upper direction, whereby the orientation state of the area which is not covered by the mask 1102 of the vertical orientation film 915 is set to a specific orientation state. Accordingly, the orientation state of the area which is not covered by the mask 1102 of the vertical orientation film 915 is set in a direction different from that of the area whose orientation state has been already set. In this treatment, the area whose orientation state has been set is coated by the mask 1102 and thus it is exposed to light, so that the orientation state of the area is not set again.

Figure 11C:
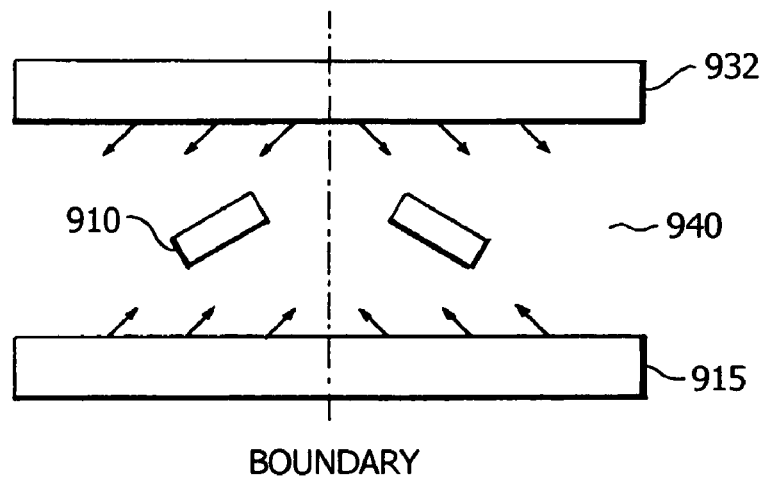
Figure 12A:
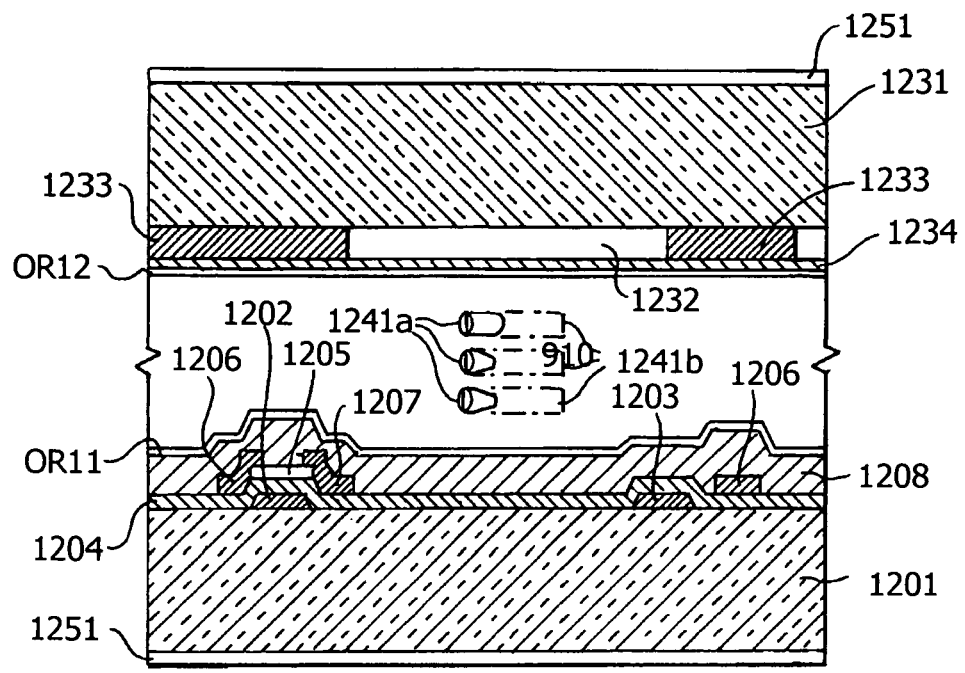
FIGS. 12A and 12B are diagrams showing the construction of a conventional IPS type TFT liquid crystal display device.
Figure 12B:
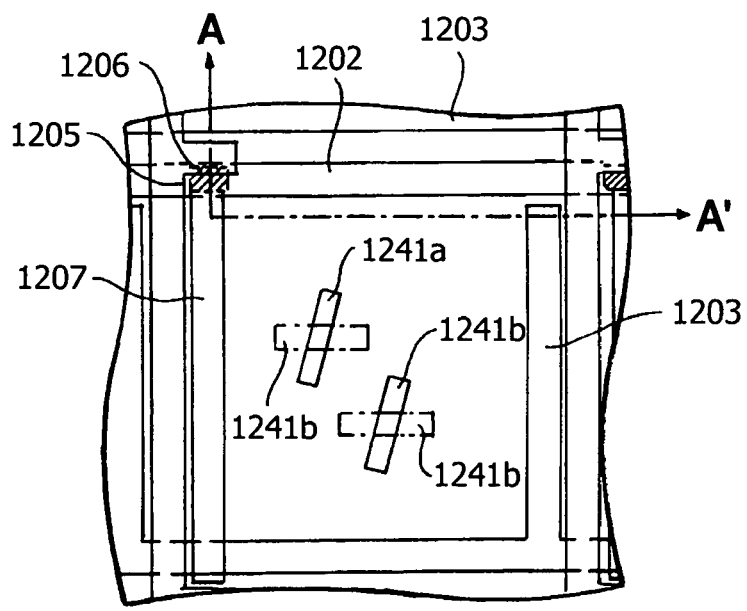

As shown in FIG. 11C, the same treatment is conducted on the vertical orientation film 932 of the counter substrate 931, and the liquid crystal layer 940 is disposed between both the substrates. As a result, in the liquid crystal layer 940, the liquid crystal molecules 941 are felled in different directions with respect to the boundary. That is, the divisional areas can be fixed as described above.

As the light orientation film may be used material having a functional group such as a cinnamic acid group which can control the orientation of the liquid crystal by polarized light, or polymer whose photosensitive groups are polymerized by irradiation of polarized light as described in "AM-LCD'96/IDW'96 Digest of Technical Papers), p 337.

Further, when the disturbance of the orientation of the liquid crystal cannot be controlled by using any one of the above two methods, the orientation state of the liquid crystal may be stored by using organic polymer material. This is performed as follows. That is, monomers or oligomers of the material are first introduced in the liquid crystal, and then the liquid crystal is set to a specific orientation direction state. Under this state, ultraviolet ray is irradiated to polymerize the monomers into polymer. As a result, the orientation state of the liquid crystal is stored.

Photocurable monomers or thermosetting monomers or oligomers of these monomers may be used as the monomers, oligomers of the organic polymer material as described above. Further, the material may contain other components insofar it contains the above components. "Photocurable monomers or oligomers" used in the present invention are not limited to materials which react with visible light, and may contain ultraviolet-ray curable monomers or the like which react with ultraviolet ray. From the viewpoint of operability, the latter materials are preferable.

Each of the above polymer compounds may have a similar structure to that of the liquid crystal molecules containing monomers, oligomers exhibiting liquid crystallinity, however, it may be such flexible material having alkylene chains because it does not necessarily aim to orient the liquid crystal. Further, it may be monomer having monofunctionality, bifunctionality or multifunctionality of trifunctionality or more. The following materials may be used as the ultraviolet-ray curable monomers in the present invention.

First, the following monofunctional acrylate compounds may be used 2-ethylhexyl acrylate, butylethyl acrylate, butoxyethyl acrylate, 2-cyanoethyl acrylate, benzyl acrylate, cyclohexyl acrylate, 2-hydroxypropyl acrylate, 2-ethoxyethyl acrylate, N,N-ethylaminoethyl acrylate, N,N-dimethylaminoethyl acrylate, dicyclopentanyl acrylate, dicyclopentenyl acrylate, glycizyl acrylate, tetrahydrofurfuryl acrylate, isobornyl acrylate, isodecyl acrylate, lauryl acrylate, morpholine acrylate, phenoxyethyl acrylate, phenoxydiethyleneglycol acrylate, 2,2,2-trifluoroethyl acrylate, 2,2,3,3,3-pentafluoropropyl acrylate, 2,2,3,3-tetrafluoropropyl acrylate, 2,2,3,4,4,4-hexafluorobutyl acrylate or the like, etc.

Further, the following monofunctional methacrylate compounds may be used: 2-ethylhexyl methacrylate, butylethyl methacrylate, butoxyethyl methacrylate, 2-cyanoethyl methacrylate, benzyl methacrylate, cyclohexyl methacrylate, 2-hydroxypropyl methacrylate, 2-ethoxyethyl methacrylate, N,N-diethylaminoethyl methacrylate, N,N-dimethylaminoethyl methacrylate, dicyclopentanyl methacrylate, dicyclopentenyl methacrylate, glycizyl methacrylate, tetrahydrofurfuryl methacrylate, isobornyl methacrylate, isodecyl methacrylate, lauryl methacrylate, morpholine methacrylate, phenoxyethyl methacrylate, phenoxydiethyleneglycol methacrylate, 2,2,2-trifluoroethyl methacrylate, 2,2,3,3-tetrafluoropropyl methacrylate, 2,2,3,4,4,4-hexafluorobutyl methacrylate or the like, etc.

Further, the following multifunctional acrylate compounds may be used: 4,4'-biphenyl diacrylate, diethylstilbestrol diacrylate, 1,4-bisacryloyloxybenzene, 4,4'-bisacryloyloxydiphenylether, 4,4'-bisacryloyloxydiphenylmetane, 3,9-bis[1,1-dimethyl-2-acryloyloxyethyl]-2,4,8,10-tetraspiro[5,5]undecane, α,α'-bis[4-acryloyloxylphenyl]-1,4-diisopropylbenzene, 1,4-bisacryloyloxytetrafluorobenzene, 4,4'-bisacryloyloxyoctafluorobiphenyl, diethyleneglycol diacrylate, 1,4-butanediol diacrylate, 1,3-butyleneglocol diacrylate, dicyclopentanyl diacrylate, glycerol diacrylate, 1,6-hexanediol diacrylate, neopentylglycol diacrylate, tetraethyleneglycol diacrylate, trimethylolpropane triacrylate, pentaerythritol tetraacrylate, pentaerythritol triacrylate, ditrimethylolpropane tetraacylate, dipentaerythritol hexaacrylate, dipentaerythritol monohydroxy pentaacrylate, 4,4'-diacryloyloxystilbene, 4,4'-diacryloyloxydimethylstilbene, 4,4'-diacryloyloxydiethylstilbene, 4,4'=diacryloyloxydipropylstilbene, 4,4'-diacryloyloxydibutylstilbene, 4,4'-diacryloyloxydipentylstilbene, 4,4'-diacryloyloxydihexylstilbene, 4,4'-diacryloyloxydifluorostilbene, 2,2,3,3,4,4-hexafluoropentanediol-1,5-diacrylate, 1,1,2,2,3,3-hexafluoroproyl-1,3-diacrylate, urethane acrylate olygomer, etc.

Still further, the following multifunctional methacrylate compounds may be used: diethyleneglycol dimethacrylate, 1,4-butanediol dimethacrylate, 1,3-butyleneglocol dimethacrylate, dicyclopentanyl dimethacrylate, glycerol dimethacrylate, 1,6-hexanediol dimethacrylate, neopentylglycol dimethacrylate, tetraethyleneglycol dimethacrylate, trimethylolpropane trimethacrylate, pentaerythritol tetramethacrylate, pentaerythritol trimethacrylate, ditrimethylolpropane tetramethacrylate, dipentaerythritol hexamethacrylate, dipentaerythritol monohydroxy pentamethacrylate, 2,2,3,3,4,4-hexafluoropentanediol-1,5-dimethacrylate, urethane methacrylate olygomer, etc.

In addition, other styrene, aminostyrene, vinyl acetate, etc. may be used. However, the material usable in the present invention is not limited to the above materials.

In the present invention, the driving voltage of each element of the liquid crystal display device is also effected by the interface mutual interaction between the polymer material and the liquid crystal material, and thus the material may be polymer compound having fluorine element. Such a polymer compound may be synthesized from compounds containing 2,2,3,3,4,4-hexafluoropentanediol-1,5-diacrylate, 1,1,2,2,3,3-hexafluoropropyl-1,3-diacrylate, 2,2,2-trifluoroethyl acrylate, 2,2,3,3,3-pentafluoropropyl acrylate, 2,2,3,3-tetrafluoropropyl acrylate, 2,2,3,4,4,4-hexafluorobutyl acrylate, 2,2,2-trifluoroethyl methacrylate, 2,2,3,3-tetrafluoropropyl methacrylate, 2,2,3,4,4,4-hexafluorobutyl methacrylate, urethane acrylate olygomer or the like. However, the present invention is not limited to the above materials. When light or ultraviolet-ray curable monomer is used as a polymer compound used in the present invention, an initiator for light or ultraviolet ray may be used.

As the initiator may be used various kinds of materials such as acetophenone group such as 2,2-diethoxyacetophenone, 2-hydroxy-2-methyl-1-phenyl-1-one, 1-(4-isopropylphenyl)-2-hydroxy-2-methylpropane-1-one, or 1-(4-dodecylphenyl)-2-hydroxy-2-methylpropane-1-one, benzoyl group such as benzomethylether, benzomethylether, benzildimethylketal or the like, benzophenone group such as benzophenone, benzoil benzoic acid, 4-phenylbenzophenone, 3,3-dimethyl-4-methoxybenzophenone or the like, thioxanthone, 2-chlorthioxanthon, 2-methylthioxanthone, or the like, diazonium salt group, sulfonium salt group, iodonium salt group, selenium salt group or the like.

If the polarized light transmission axes of the polarizing plate 951 are disposed to be at a predetermined angle, the light transmissivity can be varied by the motion of the liquid crystal molecules.

Further, when the polarized light transmission axes are set to be perpendicular to each other, the display mode of the display device is set to a normally black mode, however, in order to avoid the viewing-angle-dependence of the retardation of the initial liquid crystal orientation, a negative uniaxial compensation film and a positive uniaxial compensation film may be used in combination, whereby the viewing-angle-dependence of the black state is avoided, thereby enhancing the image quality and increasing the angle of visibility.

As described above, according to the fifth mode, the liquid crystal layer 940 can be preventing from falling into such a state that undesired electric field is applied to the liquid crystal layer in the up-and-down direction at all times, so that the degradation of the display characteristic hardly occurs unlike the conventional display device. Further, by applying the voltage to the liquid crystal molecules, the molecules are felled from the orientation state in which the molecules are oriented substantially perpendicular to the substrate, and thus there does not occur any staining when the device is viewed from a slant direction, and a wide angle-of-visibility characteristic is given.

EMBODIMENTS

Embodiments according to the present invention will be described hereunder in more detail.

First Embodiment

A substrate having an array of amorphous silicon thin film transistors (TFT) was formed on a glass substrate by repeating both of a film forming process and a lithography process. The TFT array comprises a gate-chrome layer, a silicon nitride-gate insulating layer, an amorphous silicon-semiconductor layer, a drain/source-molybdenum layer which were arranged from the substrate side in this order (see FIG. 2C). Thereafter, a protection film was formed of silicon nitride so as to cover the above layers.

Subsequently, for example a color filter layer of green was coated on the protection layer, heated and dried and formed by photolithography. The same process was repeated to form red, blue color filter layers, thereby forming a color filter layer. A light shielding portion was formed by using resin containing black pigment in the same manner. Thereafter, a common electrode was formed of chrome, and then an overcoat layer of acrylic resin was coated and then heated for one hour at 200° C.

Subsequently, a through hole was formed so as to extend to the source electrode by using photolithography, etching. A pixel electrode was formed of chrome, and SE1211 produced by Nissan Chemical Company was coated as a vertical orientation film and then heated for one hour at 200° C.

Thereafter, SE1211 produced by Nissan Chemical Company was coated as a vertical orientation film on a glass substrate having ITO formed on the back surface thereof, and then heated for one hour at 200° C., thereby forming a counter substrate.

A seal member was coated on the peripheral portions of the substrates. These substrates were attached to each other through a spacer member so that the orientation-film formed surfaces thereof face each other, and then heated for three hour at 160° C. to cure the seal member. At this time, the counter substrate was a mere substrate, and thus it is unnecessary to positionally match the substrates with high precision.

Thereafter, nematic liquid crystal having positive permittivity anisotropy was injected into the gap between the substrates, and the injection hole was sealed by photocurable resin. An optically negative compensation film 121 whose Δnd is equal in absolute value, however, opposite in sign to Δnd of the liquid crystal layer was attached, and then polarizing plates were attached to the upper and lower substrates so that the transmission axes thereof were perpendicular to each other. An optically positive compensation film may be used in place of the optically negative compensation film.

Upon measuring the angle-of-visibility characteristic of a panel thus fabricated, no gradation inversion was observed, and such an excellent angle-of-visibility characteristic that an extremely wide area having high contrast is provided can be obtained. Particularly, in this embodiment, there is not observed any staining which has been hitherto observed on a usual panel driven by lateral electric field when the panel is viewed from the slant direction. Further, no color shade is observed, and an excellent angle-of-visibility characteristic is obtained.

Second Embodiment

As in the case of the first embodiment, an array of amorphous silicon thin film transistors (TFT) was formed by repeating both the film forming process and the lithography process. TFT comprised a gate-chrome layer, a silicon nitride-gate insulating layer, a amorphous silicon-semiconductor layer and a drain/source-molybdenum layer which were arranged from the substrate side in this order as in the case of the first embodiment.

A protection film of silicon nitride was formed so as to cover the above layers, and red, blue and green color filter layers were formed in the same manner as the first embodiment. After a common electrode was formed of chrome, an overcoat layer of acrylic resin was coated and heated for one hour at 200° C.

Subsequently, a through hole was formed so as to extend to the source electrode, and a pixel electrode is formed by using ITO. SE1211 produced by Nissan Chemical Company was coated as a vertical orientation film and then heated for one hour at 200° C. in the same manner.

A seal member was coated on the peripheral portions of the substrates, and both the substrates were attached to each other through a spacer member so that the orientation-film coated surfaces thereof are confronted to each other, and heated for three hours at 160° C., thereby curing the seal member. At this time, the counter substrate was a mere substrate, and thus it is unnecessary to positionally match the substrates with high precision.

Thereafter, nematic liquid crystal having positive permittivity anisotropy was injected into the gap between the substrates, and the injection hole was sealed by photocurable resin. An optically negative compensation film 121 whose Δnd is equal in absolute value, however, opposite in sign to Δnd of the liquid crystal layer was attached, and then polarizing plates were attached to the upper and lower substrates so that the transmission axes thereof were perpendicular to each other. An optically positive compensation film may be used in place of the optically negative compensation film.

Upon measuring the angle-of-visibility characteristic of a panel thus fabricated, no gradation inversion was observed, and such an excellent angle-of-visibility characteristic that an extremely wide area having high contrast is provided can be obtained. Particularly, in this embodiment, there is not observed any staining which has been hitherto observed on a usual panel driven by lateral electric field when the panel is viewed from the slant direction. Further, no color shade is observed, and an excellent angle-of-visibility characteristic is obtained. Since the pixel electrode was formed of ITO, the opening degree was high and thus light display could be obtained.

As described above, according to the present invention, in the liquid crystal device having the transparent first and second substrates, the liquid crystal layer sandwiched between the first and second substrates and the color filter layer, the color filter layer is disposed on the first substrate, and the liquid crystal layer is disposed between the color filter layer and the second substrate. Further, on the first substrate below the color filter layer are provided plural scan signal electrodes, plural video signal electrodes arranged so as to cross the scan signal electrodes in a matrix form, and plural thin film transistors formed in association with the crossing points between the scan signal electrodes and the video signal electrodes. At least one pixel electrode is formed in each of areas surrounded by the plural scan signal electrodes and the plural video signal electrodes, and each pixel has a common electrode which is connected over plural pixels through a common electrode wire and supplies reference potential, and a pixel electrode which is connected to the corresponding thin film transistor and disposed so as to confront the common electrode in the pixel area. The common electrode and the pixel electrode are disposed between the color filter layer and the liquid crystal layer, and the common electrode and the pixel electrode are disposed in different layers through a layer-insulating film formed of transparent insulating material, and electric field having a component which is dominantly parallel to the first substrate occurs in the liquid crystal layer by applying a voltage across the common electrode and the pixel electrode.

Accordingly, by the electric field generated with the voltage applied across the common electrode and the pixel electrode, the liquid crystal of the liquid crystal layer is rotated on a plane which is substantially parallel to the substrate, and the electric field occurring in the liquid crystal layer has no effect on the color filter layer. As a result, according to the present invention, charge-up which partially occurs in the color filter layer can be suppressed, thereby suppressing occurrence of color shade of the multicolor display type liquid crystal display device.

The invention claimed is:
1. A liquid crystal display device, comprising:
a first substrate;
a second substrate, said second substrate being transparent;
a color filter layer disposed on said first substrate;
a liquid crystal layer disposed between said color filter layer and said second substrate, said liquid crystal layer having liquid crystals oriented parallel to said first substrate when no voltage is applied;
a plurality of scan signal electrodes and a plurality of picture signal electrodes, said plurality of scan signal electrodes and said plurality of picture signal electrodes oriented perpendicular to and crossing each other, to form a matrix of regions surrounded by said plurality of scan signal electrodes and said plurality of picture signal electrodes;
a plurality of thin film transistors at cross positions of said matrix;
at least one picture element disposed in each said region;

a common electrode and a pixel electrode in each of said at least one picture element, said common electrode being connected with other common electrodes in other picture elements via common electrode lines for providing a reference voltage to the plurality of picture elements, said pixel electrode being connected to a corresponding thin film transistor and being disposed at an opposite side to a position of said common electrode in a region of said picture element, said common electrode and said pixel electrode being disposed between said color filter layer and said liquid crystal, wherein said common electrode is shaped as a grid for surrounding said picture element, said pixel electrode is disposed to cross over said picture element, and a part of said common electrode line is used as said common electrode, and wherein said common electrode is formed so that said plurality of thin film transistors is hidden behind said common electrode when viewed from said second substrate;

a transparent insulating separation film disposed between a layer at which said common electrode is disposed and a layer at which said pixel electrode is disposed, an electric field being generated between said common electrode and said pixel electrode though said liquid crystal layer, said electric field being mainly parallel to said first substrate; and an overcoat layer for protecting said color filter layer disposed on said color filter layer, said common electrodes being disposed on said overcoat layer, said transparent insulating separation film being disposed on said common electrodes, and said pixel electrodes being disposed on said transparent insulating separation film.

2. A liquid crystal display device comprising:

a first substrate;

a second substrate, said second substrate being transparent;

a color filter layer disposed on said first substrate;

a liquid crystal layer disposed between said color filter layer and said second substrate, said liquid crystal layer having liquid crystals oriented perpendicular to said first substrate when no voltage is applied;

a plurality of scan signal electrodes and a plurality of picture signal electrodes, said plurality of scan signal electrodes and said plurality of picture signal electrodes oriented perpendicular to and crossing each other, to form a matrix of regions surrounded by said plurality of scan signal electrodes and said plurality of picture signal electrodes;

a plurality of thin film transistors at cross positions of said matrix;

at least one picture element disposed in each said region;

a common electrode and a pixel electrode in each of said at least one picture element, said common electrode being connected with other common electrodes in other picture elements via common electrode lines for providing a reference voltage to the plurality of picture elements, said pixel electrode being connected to a corresponding thin film transistor and being disposed at an opposite side to a position of said common electrode in a region of said picture element, said common electrode and said pixel electrode being disposed between said color filter layer and said liquid crystal, wherein said common electrode is shaped as a grid for surrounding said picture element, said pixel electrode is disposed to cross over said picture element, and a part of said common electrode line is used as said common electrode, and wherein said common electrode is formed so that said plurality of thin film transistors is hidden behind said common electrode when viewed from said second substrate;

a transparent insulating separation film disposed between layer at which said common electrode is disposed and a layer at which said pixel electrode is disposed, an electric field being generated between said common electrode and said pixel electrode through said liquid crystal layer, said electric field being mainly parallel to said first substrate;

an overcoat layer for protecting said color filter layer is disposed on said color filter layer, said pixel electrodes being disposed on said overcoat layer, wherein said transparent insulating separation film being disposed on said pixel electrodes, and said common electrodes being disposed on said transparent insulating separation film.

3. The liquid crystal display device according to claim 2, wherein at least one of said common electrode and said pixel electrode is formed of a transparent conductive film.

4. The liquid crystal display device according to claim 2, wherein a plurality of sets of said common electrode and pixel electrode are disposed in the region of said picture element.

5. The liquid crystal display device according to claim 2, wherein an optically negative compensation film and an optically positive compensation film are disposed between said first or second substrate and a polarizing plate to make a refractive index of said liquid crystal layer anisotropic and a refractive index of said compensation film isotropic.

6. The liquid crystal display device according to claim 2, wherein pre-tilt angles are beforehand formed along two directions in which liquid crystal molecules are felled when a voltage is applied.

7. A liquid crystal display device comprising:

a first substrate;

a second substrate, said second substrate being transparent;

a color filter layer disposed on said first substrate;

a liquid crystal layer disposed between said color filter layer and said second substrate, said liquid crystal layer having liquid crystals oriented perpendicular to said first substrate when no voltage is applied;

a plurality of scan signal electrodes and a plurality of picture signal electrodes, said plurality of scan signal electrodes and said plurality of picture signal electrodes oriented perpendicular to and crossing each other, to form a matrix of regions surrounded by said plurality of scan signal electrodes and said plurality of picture signal electrodes;

a plurality of thin film transistors at cross positions of said matrix;

at least one picture element disposed in each said region;

a common electrode and a pixel electrode in each of said at least one picture element, said common electrode being connected with other common electrodes in other picture elements via common electrode lines for providing a reference voltage to the plurality of picture elements, said pixel electrode being connected to a corresponding thin film transistor and being disposed at an opposite side to a position of said common electrode in a region of said picture element, said common electrode and said pixel electrode being disposed between said color filter layer and said liquid crystal, wherein said common electrode is formed so that said plurality of thin film transistors is hidden behind said common electrode when viewed from said second substrate;

a transparent insulating separation film disposed between a layer at which said common electrode is disposed and a layer at which said pixel electrode is disposed, an electric field being generated between said common electrode and said pixel electrode through said liquid crystal layer, said electric field being mainly parallel to said first substrate; and an overcoat layer for protecting said color filter layer is disposed on said color filter layer, said common electrodes being disposed on said overcoat layer, said transparent insulating separation film being disposed on said common electrodes, and said pixel electrodes being disposed on said transparent insulating separation film.

8. The liquid crystal display device according to claim 7, wherein an optically negative compensation film and an optically positive compensation film are disposed between said first or second substrate and a polarizing plate to make a refractive index of said liquid crystal layer anisotropic and a refractive index of said compensation film isotropic.

9. The liquid crystal display device according to claim 7, wherein pre-tilt angles are beforehand formed along two directions in which liquid crystal molecules are felled when a voltage is applied.

10. A liquid crystal display device, comprising:

a first substrate;

a second substrate, said second substrate being transparent;

a color filter layer disposed on said first substrate;

a liquid crystal layer disposed between said color filter layer and said second substrate, said liquid crystal layer having liquid crystals oriented parallel to said first substrate when no voltage is applied;

a plurality of scan signal electrodes and a plurality of picture signal electrodes, said plurality of scan signal electrodes and said plurality of picture signal electrodes oriented perpendicular to and crossing each other, to form a matrix of regions surrounded by said plurality of scan signal electrodes and said plurality of picture signal electrodes;

a plurality of thin film transistors at cross positions of said matrix;

at least one picture element disposed in each said region;

a common electrode and a pixel electrode in each of said at least one picture element, said common electrode being connected with other common electrodes in other picture elements via common electrode lines for providing a reference voltage to the plurality of picture elements, said pixel electrode being connected to a corresponding thin film transistor and being disposed at an opposite side to a position of said common electrode in a region of said picture element, said common electrode and said pixel electrode being disposed between said color filter layer and said liquid crystal, wherein said common electrode is shaped as a grid for surrounding said picture element, said pixel electrode is disposed to cross over said picture element, and a part of said common electrode line is used as said common electrode, and wherein said common electrode is formed so that said scan and picture signal electrodes are hidden behind said common electrode when viewed from said second substrate;

a transparent insulating separation film disposed between a layer at which said common electrode is disposed and a layer at which said pixel electrode is disposed, an electric field being generated between said common electrode and said pixel electrode through said liquid crystal layer, said electric field being mainly parallel to said first substrate; and an overcoat layer for protecting said color filter layer disposed on said color filter layer, said common electrodes being disposed on said overcoat layer, said transparent insulating separation film being disposed on said common electrodes, and said pixel electrodes being disposed on said transparent insulating separation film.

11. A liquid crystal display device comprising:

a first substrate;

a second substrate, said second substrate being transparent;

a color filter layer disposed on said first substrate;

a liquid crystal layer disposed between said color filter layer and said second substrate, said liquid crystal layer having liquid crystals oriented perpendicular to said first substrate when no voltage is applied;

a plurality of scan signal electrodes and a plurality of picture signal electrodes, said plurality of scan signal electrodes and said plurality of picture signal electrodes oriented perpendicular to and crossing each other, to form a matrix of regions surrounded by said plurality of scan signal electrodes and said plurality of picture signal electrodes;

a plurality of thin film transistors at cross positions of said matrix;

at least one picture element disposed in each said region;

a common electrode and a pixel electrode in each of said at least one picture element, said common electrode being connected with other common electrodes in other picture elements via common electrode lines for providing a reference voltage to the plurality of picture elements, said pixel electrode being connected to a corresponding thin film transistor and being disposed at an opposite side to a position of said common electrode in a region of said picture element, said common electrode and said pixel electrode being disposed between said color filter layer and said liquid crystal, wherein said common electrode is shaped as a grid for surrounding said picture element, said pixel electrode is disposed to cross over said picture element, and a part of said common electrode line is used as said common electrode, and wherein said common electrode is formed so that said scan and picture signal electrodes are hidden behind said common electrode when viewed from said second substrate;

a transparent insulating separation film disposed between a layer at which said common electrode is disposed and a layer at which said pixel electrode is disposed, an electric field being generated between said common electrode and said pixel electrode through said liquid crystal layer, said electric field being mainly parallel to said first substrate;

an overcoat layer for protecting said color filter layer is disposed on said color filter layer, said pixel electrodes being disposed on said overcoat layer, wherein said transparent insulating separation film being disposed on said pixel electrodes, and said common electrodes being disposed on said transparent insulating separation film.

12. The liquid crystal display device according to claim 11, wherein at least one of said common electrode and said pixel electrode is formed of a transparent conductive film.

13. The liquid crystal display device according to claim 11, wherein a plurality of sets of said common electrode and pixel electrode are disposed in the region of said picture element.

14. The liquid crystal display device according to claim 11, wherein an optically negative compensation film and an optically positive compensation film are disposed between said first or second substrate and a polarizing plate to make a refractive index of said liquid crystal layer anisotropic and a refractive index of said compensation film isotropic.

15. The liquid crystal display device according to claim 11, wherein pre-tilt angles are beforehand formed along two directions in which liquid crystal molecules are felled when a voltage is applied.

16. A liquid crystal display device comprising:

a first substrate;

a second substrate, said second substrate being transparent;

a color filter layer disposed on said first substrate;

a liquid crystal layer disposed between said color filter layer and said second substrate, said liquid crystal layer having liquid crystals oriented perpendicular to said first substrate when no voltage is applied;

a plurality of scan signal electrodes and a plurality of picture signal electrodes, said plurality of scan signal electrodes and said plurality of picture signal electrodes oriented perpendicular to and crossing each other, to form a matrix of regions surrounded by said plurality of scan signal electrodes and said plurality of picture signal electrodes;

a plurality of thin film transistors at cross positions of said matrix;

at least one picture element disposed in each said region;

a common electrode and a pixel electrode in each of said at least one picture element, said common electrode being connected with other common electrodes in other picture elements via common electrode lines for providing a reference voltage to the plurality of picture elements, said pixel electrode being connected to a corresponding thin film transistor and being disposed at an opposite side to a position of said common electrode in a region of said picture element, said common electrode and said pixel electrode being disposed between said color filter layer and said liquid crystal, wherein said common electrode is formed so that said scan and picture signal electrodes are hidden behind said common electrode when viewed from said second substrate;

a transparent insulating separation film disposed between a layer at which said common electrode is disposed and a layer at which said pixel electrode is disposed, an electric field being generated between said common electrode and said pixel electrode through said liquid crystal layer, said electric field being mainly parallel to said first substrate; and an overcoat layer for protecting said color filter layer is disposed on said color filter layer, said common electrodes being disposed on said overcoat layer, said transparent insulating separation film being disposed on said common electrodes, and said pixel electrodes being disposed on said transparent insulating separation film.

17. The liquid crystal display device according to claim 16, wherein an optically negative compensation film and an optically positive compensation film are disposed between said first or second substrate and a polarizing plate to make a refractive index of said liquid crystal layer anisotropic and a refractive index of said compensation film isotropic.

18. The liquid crystal display device according to claim 16, wherein pre-tilt angles are beforehand formed along two directions in which liquid crystal molecules are felled when a voltage is applied.

* * * * *